US012584821B2

(12) United States Patent
Eicher

(10) Patent No.: US 12,584,821 B2
(45) Date of Patent: Mar. 24, 2026

(54) SENSOR NETWORK-BASED ANALYSIS AND/OR PREDICTION METHOD, AND REMOTE MONITORING SENSOR DEVICE

(71) Applicant: Geobrugg AG, Romanshorn (CH)

(72) Inventor: Manuel Eicher, Winden (CH)

(73) Assignee: Geobrugg AG, Romanshorn (CH)

( * ) Notice: Subject to any disclaimer, the term of this patent is extended or adjusted under 35 U.S.C. 154(b) by 408 days.

(21) Appl. No.: 18/042,850

(22) PCT Filed: Aug. 26, 2021

(86) PCT No.: PCT/EP2021/073575
§ 371 (c)(1),
(2) Date: Feb. 24, 2023

(87) PCT Pub. No.: WO2022/048981
PCT Pub. Date: Mar. 10, 2022

(65) Prior Publication Data
US 2023/0296480 A1      Sep. 21, 2023

(30) Foreign Application Priority Data

Sep. 1, 2020      (DE) ..................... 10 2020 122 861.9

(51) Int. Cl.
*G01M 99/00*          (2011.01)
*G01L 5/04*           (2006.01)
(Continued)

(52) U.S. Cl.
CPC .......... *G01M 99/00* (2013.01); *G01N 17/006* (2013.01); *G01L 5/04* (2013.01); *H04W 84/18* (2013.01)

(58) Field of Classification Search
CPC ....... G01M 99/00; H04W 84/18; H04W 4/38; H04L 67/12; G01N 33/0031;
(Continued)

(56) References Cited

U.S. PATENT DOCUMENTS 7,526,944 B2      5/2009   Sabata et al.
8,886,468 B1      11/2014  diGirolamo
(Continued)

FOREIGN PATENT DOCUMENTS

DE      10 2017 123 810 A1      4/2019
EP          3 524 948 A1      8/2019
(Continued)

OTHER PUBLICATIONS

Office Action dated Mar. 26, 2024 issued in corresponding Saudi Arabian patent application No. 523442722 (and English translation).

(Continued)

*Primary Examiner* — Manuel L Barbee
(74) *Attorney, Agent, or Firm* — Posz Law Group, PLC

(57)          ABSTRACT

A sensor-network-based analysis and/or prediction method for protection from natural hazards includes receiving and collecting electronic sensor data from distributedly arranged sensor modules of an outdoor sensor network in an external analysis and/or prediction unit. The sensor data includes outdoor corrosion measurement data, impact sensor data and/or rope force sensor data. The sensor data includes tropospheric measurement data. One or more tropospheric measurement dataset is, in particular geographically, allocated to each outdoor corrosion measurement dataset. The analysis and/or method also includes storing the received sensor data of the outdoor sensor network in a memory unit of the external analysis and/or prediction unit; analyzing the received sensor data for a determination of a natural hazard risk in respective application areas of the sensor modules by the external analysis and/or prediction unit; and providing the natural hazard risk determined by the external analysis and/or prediction unit to an authorized user group.

32 Claims, 7 Drawing Sheets

(51) Int. Cl.
G01N 17/00 (2006.01)
H04W 84/18 (2009.01)

(58) Field of Classification Search
CPC .. G01N 33/0075; G01N 17/00; G01N 17/006;
G01N 17/008; G01L 5/04; G01D 15/00;
G06Q 50/00
See application file for complete search history.

(56) References Cited

U.S. PATENT DOCUMENTS

| | | | | |
|---|---|---|---|---|
| 2005/0145018 | A1 | 7/2005 | Sabata et al. | |
| 2008/0150555 | A1 | 6/2008 | Wang et al. | |
| 2017/0301220 | A1* | 10/2017 | Jarrell | F21S 8/088 |
| 2018/0229970 | A1* | 8/2018 | Lehtinen | D07B 1/162 |
| 2020/0232904 | A1* | 7/2020 | Wendeler-Goeggelmann | |
| | | | | G01N 17/04 |
| 2021/0063336 | A1* | 3/2021 | Ghods | B28C 5/422 |
| 2022/0091057 | A1* | 3/2022 | Gray | G01N 27/045 |

FOREIGN PATENT DOCUMENTS

| | | |
|---|---|---|
| JP | 2002-297834 A | 10/2002 |
| JP | 2018-077678 A | 5/2018 |
| KR | 10-2009-0101182 A | 9/2009 |

OTHER PUBLICATIONS

Office Action dated May 10, 2024 issued in corresponding Indian patent application No. 202317015252.

Office Action dated Oct. 31, 2024 issued for the corresponding New Zealand Patent Application No. 796896.

Office Action dated Nov. 29, 2024 issued for the corresponding New Zealand Patent Application No. 796896.

Office Action dated Nov. 13, 2024 issued for the corresponding Korean Patent Application No. 10-2023-7009305 (and English translation).

Office Action dated Dec. 13, 2024 issued for the corresponding Chilean Patent Application No. 202300544 (and English translation).

Office Action dated Dec. 31, 2024 issued for the corresponding Vietnamese Patent Application No. 1-2023-01855 (and English translation).

Office Action dated Dec. 17, 2024 issued for the corresponding Argentinian Patent Application No. 20210102445 (and English translation).

Office Action dated Oct. 4, 2023 issued in corresponding TW patent application No. 110132394 (and English translation).

Office Action dated Oct. 20, 2023 issued in corresponding RU patent application No. 2023 107 238 (and English translation).

Office Action dated Nov. 7, 2023 issued in corresponding IR patent application No. 140150140003008678 (and English translation).

Office Action dated Nov. 22, 2023 issued in corresponding AU patent application No. 2021336062.

Office Action dated Dec. 19, 2023 issued in corresponding JP patent application No. 2023-513656 (and English translation).

German Search Report mailed Mar. 26, 2021 in counterpart German Patent Application No. DE 10 2020 122 861.9 (and partial English translation).

Taiwanese Office Action mailed Feb. 2, 2023 in counterpart Taiwanese Patent Application No. 110132394 (and English machine translation).

International Preliminary Report on Patentability of the International Searching Authority mailed Mar. 7, 2023 and Written Opinion of the International Searching Authority mailed Dec. 23, 2021 in corresponding international application PCT/EP2021/073575 (English translation only).

Achillopoulou, D.V. et al. "Monitoring of transport infrastructure exposed to multiple hazards: a roadmap for building resilience". Science of the Total Environment, Jul. 18, 2020, pp. 1-25.

Office Action dated Jul. 29, 2024 issued for the corresponding Canadian Patent Application No. 3,191,135.

Indian Hearing Notice of Jun. 3, 2025 received in corresponding Indian patent application No. IN 202317015252 filed on Mar. 7, 2023.

Canadian Office Action of Aug. 7, 2025 received in corresponding patent application No. CA 3,191,135.

Korean Office Action of Jul. 28, 2025 received in corresponding patent application No. KR 10 2023 7009305.

\* cited by examiner

SENSOR NETWORK-BASED ANALYSIS AND/OR PREDICTION METHOD, AND REMOTE MONITORING SENSOR DEVICE

CROSS REFERENCE TO RELATED APPLICATIONS

This application is based on and incorporates herein by reference the German patent application DE 10 2020 122 861.9 filed on Sep. 1, 2020, as well as the PCT patent application PCT/EP2021/073575 filed on Aug. 26, 2021.

STATE OF THE ART

The invention concerns an analysis and/or prediction method, a remote-monitoring sensor device, an outdoor sensor network and a construction.

Sensor networks monitoring, among other things, corrosion progress within constructions, for example in pipelines (cf. U.S. Pat. No. 7,526,944 B2) or in armored concrete (cf. U.S. Pat. No. 8,886,468 B1), have already been proposed. However, in the field of natural hazard prevention the essential problem of corrosion has not been considered in a satisfactory manner up to now.

The objective of the invention is in particular to provide a generic method and/or a generic device having advantageous characteristics in regard to natural hazard prevention and/or protection from natural hazards. The objective is achieved according to the invention.

A sensor-network-based analysis and/or prediction method for a protection from natural hazards is proposed, comprising at least the following method steps:

Receiving and collecting electronic sensor data from distributedly arranged sensor modules of an outdoor sensor network in an external analysis and/or prediction unit, the sensor data comprising at least outdoor corrosion measurement data and/or rope force sensor data, the sensor data comprising at least tropospheric measurement data, and at least one tropospheric measurement dataset being, in particular geographically, allocated to each outdoor corrosion measurement dataset, Storing the received sensor data of the outdoor sensor network in an, in particular centrally or distributedly arranged, memory unit of the external analysis and/or prediction unit, for example in an, in particular centrally or distributedly arranged, electronic (volatile or nonvolatile) data storage medium of the external analysis and/or prediction unit or in an, in particular centrally or distributedly arranged, magnetic storage medium of the external analysis and/or prediction unit, Analyzing the received, in particular stored, sensor data of the outdoor sensor network for a determination of a natural hazard risk in respective application areas of the sensor modules of the outdoor sensor network by the external analysis and/or prediction unit, wherein at least one further information regarding the application area, which is different from the outdoor corrosion measurement data and the tropospheric measurement data, is directly integrated into the analysis for a determination of the natural hazard risk, and Providing the natural hazard risk determined by the external analysis and/or prediction unit to an, in particular authorized, user group.

This allows comprehensive and/or significant information concerning natural hazard risks being advantageously obtained, processed and/or transferred into action and/or instructions for action. It is advantageously possible by means of an outdoor sensor network, which in particular also collects data from different sensor types, to enable an especially precise and reliable mapping and/or monitoring of an application area or a plurality of application areas. In a sensor-network-based analysis and/or prediction method, in particular the collected data of the distributedly arranged sensor modules are together analyzed, preferably in an automated and/or computer-based fashion. In the sensor-network-based analysis and/or prediction method, predictions are created for a future development of the sensor data or of the monitored application areas in general, in particular on the basis of the analysis of the collected data of the distributedly arranged sensor modules.

By "natural hazards" are in particular geophysical natural hazards to be understood. Natural hazards are in particular to mean natural, preferably geological, physical and/or geophysical, phenomena which may have a negative effect on humans, animals or constructions. A natural hazard may, among other things, be a rockfall, a debris flow, a debris flow, an avalanche, an erosion, but also a natural process influencing a stability of a construction, like for example a corrosion, in particular an atmospheric corrosion, at least of part of the construction, or just an (atmospheric) corrosion potential in a certain region. A "natural hazard risk" may in this context be, for example, an estimated risk of one of the aforementioned phenomena occurring, in particular before setting up a prevention measure or with an existing natural hazard prevention measure, an estimated risk based on a status of a natural hazard prevention measure and/or of a construction, or a risk prediction, for example a prediction of a lifetime of a natural hazard prevention measure and/or of a construction. Preferably, a "natural hazard risk" is to mean a corrosion risk, a rockfall risk and/or a risk of a debris flow occurring.

By an "outdoor sensor network" is in particular a sensor network to be understood which (exclusively) comprises sensor modules which are located externally, preferably outside buildings or other enclosures like pipelines and the like, and which are preferentially exposed to an open atmosphere (outside atmosphere). In particular, an "outdoor sensor network" is to mean an open-air sensor network and/or a sensor network that is exposed to the outside atmosphere and measures the outside atmosphere or effects induced by the outside atmosphere. An "external analysis and/or prediction unit" is in particular to mean a data processing unit or a data processing network, for example a computer or a computer network (e. g. a cloud) with at least one processor, at least one memory unit (RAM, ROM, etc.) and at least one operation program that can be called up from the memory unit. by the processor. In particular, the external analysis and/or prediction unit is implemented at least partly separately from sensor modules of the outdoor sensor network. In particular, the external analysis and/or prediction unit is located at a distance from the sensor modules of the outdoor sensor network, preferably at a distance of at least more than one kilometer. In particular, the external analysis and/or prediction unit is configured for receiving, collecting, analyzing and/or providing sensor data from different sensor modules of the outdoor sensor network, preferably from sensor modules of the outdoor sensor network which are allocated to different application areas. The external analysis and/or prediction unit is, for example, realized as a central computing center or as a distributedly arranged computing network (keyword "cloud computing"), which receives, collects, analyzes and/or provides data of an outdoor sensor network that is located distributedly all over the world or data from a plurality of outdoor sensor networks which are located all over the world. The external analysis and/or prediction unit is in particular configured for a wireless reception of the electronic sensor data of the outdoor sensor network measured by the sensor modules. The external analysis and/or prediction unit is in particular configured for storing the received sensor data in the (central or distributedly arranged) memory unit. The external analysis and/or prediction unit is in particular configured for receiving raw sensor data and/or sensor data which were already pre-analyzed in the sensor modules. "Configured" is in particular to mean specifically programmed, designed and/or equipped. By an object being configured for a certain function is in particular to be understood that the object fulfills and/or executes said certain function in at least one application state and/or operation state.

By "outdoor corrosion measurement data" are in particular measurement data to be understood which allow inferring a corrosion caused by the outside atmosphere. By the "outdoor corrosion measurement data" are in particular open-air corrosion measurement data to be understood. The "outdoor corrosion measurement data" are, for example, measured via measuring a corrosion current which is, for example, generated by a corrosion of a measurement device induced by the outside atmosphere. In particular, the outdoor corrosion measurement data are measured by an outdoor corrosion sensor, in particular an open-air corrosion sensor, of the sensor module. By "rope force sensor data" are in particular measurement data to be understood which allow deducing at least one rope force applied at, in particular pulling at, a rope, in particular a wire rope, of a construction, in particular a catchment and/or stabilization construction. The rope force sensor data may in particular be configured for a detection of an impact in the construction, an impact intensity of the impact in the construction, a filling level of the construction (keyword "debris flow barrier") or something like that. By "impact sensor data" are in particular measurement data to be understood which allow deducing at least one impact of an impacting body in a construction, in particular a catchment construction. It is conceivable that the impact sensor data are determined on the basis of the same measurement signal as the rope force sensor data. By "tropospheric measurement data" are in particular measurement data to be understood which allow a deduction of at least one parameter of the troposphere, in particular the troposphere surrounding the sensor module. The "tropospheric measurement data" may be, for example, temperature data, air moisture data, rainfall data, solar irradiation data, wind speed data, wind direction data, air pressure data, dew point data, or the like, and/or also air pollution data, trace gas measurement data (for example sulfur or similar in volcanic regions), ozone measurement data, aerosol concentration measurement data, aerosol composition measurement data, hydroxide measurement data, pH value measurement data, salt concentration measurement data, or the like. Preferably a tropospheric measurement dataset, in particular of a sensor module, comprises at least two, preferably at least three and particularly preferentially more than three different types of tropospheric measurement data at the same time. "Distributedly arranged" is in particular to mean arranged so as to be distributed over an application area and/or arranged so as to be distributed over several application areas.

By a tropospheric measurement dataset being allocated to an outdoor corrosion measurement dataset is in particular to be understood that the outdoor corrosion measurement dataset and the tropospheric measurement dataset are in a logical connection with each other. Preferably, the tropospheric measurement dataset is geographically allocated to the outdoor corrosion measurement dataset, in particular geographically allocated in such a way that both measurement datasets are recorded in great proximity to each other, for example at a distance of maximally 10 cm, preferably maximally 25 cm, advantageously no more than 1 m, preferentially no more than 10 m and especially preferentially no more than 100 m. By the term "application area" are/is in particular a construction, a construction ensemble, a natural hazard prevention measure and/or a location, like for example a slope or the like, to be understood. The "further information regarding the application area" may be any information that differs from the outdoor corrosion measurement data and the tropospheric measurement data, for example, among other things, a further measurement dataset or a characteristic of a construction and/or of a natural hazard prevention measure, like for example a thickness of a corrosion protection coating of a portion of the construction, a type of the construction and/or of the natural hazard prevention measure, or a local topography. The determined natural hazard risk is provided to the user group in particular electronically, for example as an electronic notification or as a retrieval via a portal, like for example an internet portal. Preferentially the persons of the authorized user group have an authorization to access a portal in which the determined natural hazard risks are shown in a pre-processed, e. g. graphically pre-processed, manner. Alternatively, it is of course also conceivable that no special authorization is required and at least a portion of the provided data are freely available. It is in particular conceivable that, on the basis of the determined natural hazard risks, warnings and/or alarms are output to the, in particular authorized, user group. For this purpose the external analysis and/or prediction unit executes, for example, an—in particular intelligent and/or automated—assessment of the determined natural hazard risks, and alarms and/or warns the user group autonomously in case a critical state is identified. Examples for this would be the analysis and/or prediction unit ascertaining on the basis of the analyzed sensor data that there has been an impact in a construction or that a corrosion state of a construction has exceeded an, in particular predeterminable, tolerance threshold.

It is further proposed that at least one of the application areas is a construction comprising metal components which are exposed to atmospheric corrosion, in particular outside-situated metal wires and/or metal wire ropes, preferably outside-situated corrosion-protection-coated (Zn, ZnAl, plastic, etc.) steel wires and/or stainless-steel wires, and that the natural hazard risk provided to the user group comprises a remaining lifetime of the construction that has been determined on the basis of the sensor data. As a result, a high degree of safety is advantageously achievable. It is advantageously possible to optimize planning of maintenance, renovating, new building, etc. of the construction. Advantageously a maintenance schedule and/or a renovation plan of the construction can be organized. Moreover, it is advantageously possible to optimize a comprehensive maintenance schedule comprising maintenance of a plurality of constructions which are located in different sites. For example, routes and/or operating times of maintenance vehicles and/or maintenance staff can be optimized by an appropriate maintenance sequence of the different constructions. Furthermore, in this way time-optimized ordering of maintenance material and/or expendable material, for example replacement parts, is advantageously enabled. As a result, expenses for storage and/or a dimension of storage are/is advantageously reducible. The construction is in particular realized as a catchment device, in particular a catchment construction, for example a rockfall barrier, a debris flow barrier, an avalanche barrier, a rockfall drapery, an attenuator, etc., as a stabilization device, in particular a stabilization construction, for example a slope securing, an avalanche defense, etc., or as a further construction comprising rope and/or wire structures, like a suspension bridge, for example a pedestrian suspension bridge, a roof construction, for example a stadium roof construction, a glass façade, a mast anchoring, a wind wheel anchoring, etc.

The remaining lifetime is in particular implemented as a remaining-lifetime parameter. The remaining-lifetime parameter is in particular implemented as an (approximate) time information calculated on the basis of the sensor data, preferably at least on the basis of the outdoor corrosion measurement data and the tropospheric measurement data. For example, the remaining-lifetime parameter gives the remaining lifetime of the construction as a remaining number of years, months and/or days. Alternatively, the remaining-lifetime parameter gives the remaining lifetime of the construction as a target date (exact to the year, month or day). Alternatively, the remaining-lifetime parameter may moreover be implemented as a percentage indicating, for example, a percentage of a remaining residual-layer thickness of a corrosion protection layer, a percentage of a layer thickness of a corrosion protection layer that has already been removed, a remaining percentage of a pre-calculated total lifetime, or something like that. In particular, for a calculation of the remaining lifetime in this case at least the thickness, in particular an initial thickness, of the corrosion protection layer of the monitored metal component of the construction is taken into account as the further information regarding the application area. Alternatively, the remaining-lifetime parameter may also be implemented as a percentage indicating, for example, a percentage of a filling of a barrier (percentage already filled or percentage still available), for example of a debris flow barrier. In particular, for the calculation of the remaining lifetime in this case at least one measured filling level parameter of the barrier, for example a rope force acting on an anchoring rope of the barrier, is taken into account as the further information regarding the application area. It is also conceivable that, for a calculation of the remaining lifetime, in both cases at least one climate prediction, for example a climate prediction based on weather data measured in the past, and/or a climate prediction based on weather data expected for the future, in particular with consideration of a local and/or global climate change, are/is integrated as the further information regarding the application area. In particular, the determined remaining lifetime is, preferably all over the world, provided to the user group, for example, by an electronical display unit, which preferably has internet access.

If the provided natural hazard risk comprises an, in particular standardized, corrosion protection layer removal rate, in particular zinc protection layer removal rate, of corrosion-protection-coated, in particular zinc-coated, metal components, which has been determined on the basis of the sensor data, it is advantageously possible to deduce in a particularly simple manner a remaining lifetime of structural components coated with a corrosion protection layer. It is in particular possible to deduce from a removal rate for a certain material, for example zinc, a removal rate of other materials, thus advantageously making a high flexibility of usage achievable. By a "standardized corrosion protection layer removal rate" is in particular a corrosion protection layer removal rate to be understood which can be translated for different types of corrosion protection layers. Types of corrosion protection layers may in particular be zinc coatings, ZnAl coatings, ZnAlMn coatings, PET sheaths, PVC sheaths, etc. In particular, the corrosion protection layer removal rate can also be translated into stainless-steel corrosion rates.

Furthermore, it is proposed that the provided natural hazard risk comprises a rope force change in a rope which anchors a debris flow barrier, an avalanche defense, a rockfall barrier and/or a further construction, which is in particular capable of filling up slowly, said rope force change being determined on the basis of the sensor data. In this way it is advantageously possible to determine a filling level of the debris flow barrier, the avalanche defense, the rockfall barrier and/or the further construction, which defines a remaining lifetime of the debris flow barrier, the avalanche defense, the rockfall barrier and/or the further construction.

Beyond this it is proposed that a corrosion classification of a geographical environment of the application area is defined taking the determined corrosion protection layer removal rate into account. This advantageously allows achieving an especially accurate and/or reliable corrosion classification of the geographical environment of the application area. It is advantageously possible, in particular in contrast to the widely-used corrosion classifications based only on geographical and/or climatological framework conditions, to permit a corrosion classification based on real corrosion measurements. In particular, the corrosion classification is made according to categories C1 bis CX of the standard DIN EN ISO 12944-1:2019-01. In particular, the environment of the application area is allocated a corrosion class on the basis of the value of the determined corrosion protection layer removal rate.

In addition, it is proposed that in at least one application area, in particular in at least one location that was not secured before, the sensor modules of the outdoor sensor network are installed prior to a natural hazard securing measure, and that then an assessment of a necessity of implementing the natural hazard securing measure is made depending on the determined natural hazard risk. This advantageously allows determining an assessment of a necessity of a natural hazard securing measure in a certain location. As a result, it is advantageously possible to optimize an overall utilization of resources for the natural hazard prevention. Advantageously safety can be augmented, in particular as natural hazard securing measures can be placed effectively. It is advantageously possible to create an expert tool which considerably facilitates decision-finding pro or contra a natural hazard securing measure. In particular, a probability of an occurrence of a phenomenon constituting a natural hazard, e. g. a rockfall, a debris flow, a landslide, an erosion, etc., is calculated from the sensor data (e. g. the tropospheric sensor data) collected by the sensor modules preferably during a significant time interval (for example for at least one year or for at least two years). In particular, the calculated probability is provided to a user group comprising decision makers for a weighting of a pro or contra of the natural hazard securing measure. In particular, the assessment of the necessity of executing the natural hazard securing measure comprises a specification of a probability of an occurrence of the phenomenon constituting a natural hazard within a time interval, for example within an average lifetime of the natural hazard securing measure. In particular, the natural hazard securing measure may comprise one or a plurality of the aforementioned catchment and/or stabilization constructions. It is moreover conceivable that the assessment of the necessity of executing the natural hazard securing measure comprises a risk categorization (comprising, for example, at least the categories ("high risk", "moderate risk", "low risk").

It is further proposed that in at least one application area the sensor modules of the outdoor sensor network are installed prior to a planned building measure, and that then a confectioning of the planned building measure is carried out depending on the determined natural hazard risk. This advantageously allows achieving a high level of safety. A suitable confectioning of the construction, in particular of one of the aforementioned catchment and/or stabilization constructions, is advantageously achievable. A "confectioning of the planned building measure" is in particular to mean a design, preferably in regard to a strength, a robustness, etc., of the construction that is to be built. For example, a catching capacity of a rockfall barrier can be adapted to sizes and/or frequencies of rockfall events that are to be expected. It is for example possible to adapt an anchoring of a slope securing to erosion intensities which are to be expected. For example, an anchoring of a slope securing can be adapted to erosion intensities which are to be expected.

If the building measure comprises an installation of a wire netting and/or of a wire rope, wherein a selection of a type and/or thickness of a corrosion protection layer of the wire netting and/or the wire rope is made on the basis of the determined natural hazard risk, advantageously an optimum corrosion protection and thus an optimum and/or a preferably long lifetime of the installation is achievable. A "type of a corrosion protection layer" is in particular to mean a material and/or a composition of the corrosion protection layer (for examples: Cf. above). In particular, in strongly corrosive environments, for example in a humid climate and/or near the sea, a corrosion protection layer having a higher resistance (e. g. Zn/Al) or a different corrosion protection with a higher resistance (e. g. stainless-steel wires) will be preferred to a less resistant corrosion protection layer (e. g. Zn). In particular, in strongly corrosive environments, e. g. in a humid climate and/or near the sea, a wire with a thicker corrosion protection layer (e. g. more than 150 g/m²) will be preferred to a wire with a thinner corrosion protection layer (e. g. less than 150 g/m²). In particular, in less corrosive environments, for example in and desert regions, a considerably cheaper wire with a comparably thin corrosion protection layer will be sufficient. In particular, a confectioning calculated on the basis of the sensor data is provided to a user group, which in particular comprises building planners, in order to support the planning and/or designing of the building measure. In particular, in order to support the planning and/or designing of the building measure, a user group, which in particular comprises building planners, is provided with a recommendation that is calculated on the basis of the sensor data and concerns the type and/or the thickness of the corrosion protection layer.

If moreover a selection of a wire thickness and/or of a material of the wire netting and/or of the wire rope is made on the basis of the determined natural hazard risk, and/or if a selection of a dimension, in particular total extent dimension, of the wire netting and/or of a mesh size of meshes of the wire netting is made on the basis of the determined natural hazard risk, a high level of safety is advantageously achievable. This advantageously allows adapting a protection precisely to strengths and/or intensities of natural hazards that are to be expected. Advantageously, a high cost-efficiency and/or a long lifetime are/is achievable. Conceivable selectable (minimum) wire thicknesses are, for example, among others, 2 mm, 3 mm, 4 mm, 5 mm, 6 mm or 7 mm. Conceivable selectable materials are, among others, steel, high-tensile steel (which means in particular steel having a nominal tensile strength of 800 N/mm² or more) or stainless steel. In particular, a tensile strength of the wire netting and/or of the wire rope, in particular the steel wire netting and/or the steel wire rope, may be realized on the basis of the determined natural hazard risk. Conceivable minimum nominal tensile strengths of selectable steel wires are, for example, among others, 400 N/mm², 800 N/mm², 1000 N/mm², 1770 N/mm², 2200 N/mm² or 3000 N/mm². A dimension of the wire netting is in particular defined depending on a determined dimension of a danger region ascertained via the sensor modules. It is for example ascertained, on the basis of the sensor data, in which gradient range a securing of a terrain by means of a catchment and/or stabilization construction is necessary in a certain location. In particular, a recommendation regarding the wire thickness, the wire material, the dimension of the wire netting, the exact position of the wire netting and/or the mesh size of the meshes of the wire netting, calculated on the basis of the sensor data, is provided to a user group, which in particular comprises building planners, in order to support the planning and/or designing of the building measure.

Furthermore, it is proposed that the further information regarding the application area comprises at least the geographic coordinates of the respective sensor modules installed in the application area, and that these geographic coordinates are used when a natural hazard risk is determined which is realized as a corrosion map at least of the application area and/or of nearby surroundings of the application area, showing corrosion data, e. g. corrosion classifications, corrosion intensity values, corrosion protection layer removal rates, etc. This advantageously allows obtaining a detailed coverage of an, in particular at least local, corrosivity of the application area and/or of the nearby surroundings of the application area. Advantageously this also allows small-scale local differences being made visible by corrosivity (said differences being for example due to a location within or without a rain shadow, to a location in an area within or without a high solar irradiation intensity or to a location in a spray range of a waterfall or of an ocean surf, etc.). In particular, when the sensor module is installed, the geographic coordinates allocated to a sensor module are ascertained and/or are copied onto the sensor module. Alternatively, it is conceivable that he sensor module has a GPS functionality of its own. The corrosion map is in particular implemented as a map representation comprising a combination of geodata and corrosion data linked to geographic coordinates. In particular, the corrosion map calculated on the basis of the sensor data is provided to the user group, for example for supporting the planning and/or designing of building measures. In particular, the corrosion map, preferably the representation of the corrosion map provided to the user group, comprises a superposition of a map, e. g. a political map, a topographic map and/or a geological map or the like, with spatially resolved, in particular measured, interpolated and/or simulated, corrosion data and/or corrosion classifications.

If the corrosion map is incorporated in a Building Information Modeling System (BIM system), in particular of an application area that is embodied as a natural hazard prevention installation, preferably a construction, preferentially a catchment and/or stabilization construction, advantageously an especially effective, simple and transparent management of the application area, in particular the construction, is enabled. Advantageously it is possible to improve a real estate management, in particular facility management. Advantageously, locations which are critical in regard to wear and tear, for example due to corrosion, can be made clearly perceivable in a user-friendly manner. The BIM system in particular comprises a virtual, geometrically visualized model of the application area, in particular the construction, which the corrosion map is preferably superimposed on. This allows directly perceiving which locations and/or portions of the application area, in particular of the construction, could be exposed to increased corrosion. Advantageously the corrosion map integrated in the BIM model can be actualized during an entire lifetime of the construction of the BIM model. In particular, the BIM model superimposed by the corrosion map is provided to the user group, for example in order to support a construction management.

If moreover on the basis of the determined corrosion map an, in particular local, optimization is carried out of an application area which is embodied as a natural hazard prevention installation, advantageously a high level of safety is achievable. Advantageously an efficient and/or precisely adapted implementation of the natural hazard prevention installation is achievable. By the term "natural hazard prevention installation" is in particular a catchment and/or stabilization construction to be understood. A "local optimization" of a natural hazard prevention installation is in particular to mean a local adaption of the implementation of the natural hazard prevention installation, for example a local reinforcement (e. g. by modifying a wire thickness, a thickness of a corrosion protection coating, etc.) of the natural hazard prevention installation, by a local enlargement of the natural hazard prevention installation, or something like that. It is for example conceivable that if increased corrosivity has been ascertained in a subregion of the application area, a different corrosion protection is selected for a wire netting arranged in this subregion, and/or that in this subregion a second wire netting is installed next to or above a first wire netting, etc. It is conceivable that the optimization is taken on already before a first installation of the natural hazard prevention installation, or that the optimization is realized only subsequently on an already-installed natural hazard prevention installation.

Furthermore, it is proposed that beyond a surrounding region of the application area the corrosion map is filled with simulated corrosion data, wherein in regions of the corrosion map which are free of sensor modules of the outdoor sensor network the corrosion data are determined at least on the basis of sensor data from sensor modules in other application areas, in particular in neighboring application areas and/or in geographically and/or climatologically similar application areas. As a result, advantageously a corrosion map can be obtained which covers a particularly large area while based on real corrosion measurement data. Advantageously this enables a reliable support of a construction planning for a geographically large region. Moreover, advantageously even in regions for which there are no measurement data (e. g. corrosion measurement data) yet, a construction planning is enabled which is supported by real measurement data. In particular, for determining the corrosion data in regions which are free of sensor modules of the outdoor sensor network, an interpolation is made between the corrosion data of two neighboring application areas in which there are sensor modules with corrosion sensors. In particular, the regions which are free of sensor modules of the outdoor sensor network are compared to application areas in which there are sensor modules with corrosion sensors, wherein preferably when ascertaining a geographic and/or climatological similarity, an assumption is made that the corrosion data should be at least substantially the same in geographically and/or climatologically similar application areas. In particular, in such a case the geographically and/or climatologically similar application areas are then allocated the same corrosion data as the application area in which the corrosion data are actually measured. By "simulated corrosion data" are in particular corrosion data to be understood which are not based on direct on-site measurements but are calculated, for example, from empirical values, from comparisons with known corrosion measurement data and/or via interpolations of known corrosion measurement data. In particular, the corrosion map complemented in this way is provided to the user group, for example for a support of further new building measures or for a decision regarding further new building measures.

It is further proposed that the further information regarding the application area comprises at least an intensity of wildlife activities and/or of anthropogenic activities, for example walkers' activities, in nearby surroundings of the application area. Studies have shown that in this way a substantial improvement of the determination of natural hazard risks is advantageously achievable. As a result, it is in particular possible to specify a natural hazard prediction, like for example a rockfall prediction. High, in particular seasonal, wildlife activities or high, in particular seasonal, anthropogenic activities, for example of walkers, may result in an increased dislocation of material in the application area, which may substantially augment, in particular under certain atmospheric conditions, a probability of events which are detectable by the sensor module, like rockfall events. Thus a natural hazard risk may—at least seasonally—be substantially influenced, in particular seasonally increased, by the respective intensity of activities. In particular, the outdoor sensor network is configured for capturing the wildlife activities and/or the anthropogenic activities. Preferably the outdoor sensor network comprises at least one camera, in particular at least one wildlife camera, which is configured to record and/or count wild animals and/or humans, for example walkers. Alternatively, the wildlife activities and/or the walkers' activities may also be gathered from external data concerning the application area and/or its surroundings, for example via external wildlife cameras, via wildlife counting carried out by gamekeepers, via counts of sold parking tickets of walkers' parking sites, via counts of sold mountain railway tickets, etc. The term "nearby surroundings" is in particular to mean surroundings within few kilometers, e. g. maximally 10 km, maximally 5 km or maximally 2 km, around the application area, preferably around utmost edges of the application area or preferably surroundings within a few hundred meters, e. g. maximally 800 m, maximally 500 m or maximally 300 m around the application area, preferably around utmost edges of the application area.

Alternatively or additionally it is proposed that the further information regarding the application area comprises at least air quality data in nearby surroundings of the application area. Studies have shown that in this way a substantial improvement of the determination of natural hazard risks is advantageously achievable. As a result, it is in particular possible to specify a prediction of a remaining lifetime of a metal component of a construction which is subject to corrosion, in particular as certain air contaminants may have a corrosion-enhancing effect. The air quality data may in particular comprise data regarding trace gases or aerosols which may be contained in the air. For example, aerosol droplets may have low pH values or high concentrations of salt, which may precipitate onto the metal components, thus influencing corrosion. For example, in certain regions (e. g. near volcanoes or in cities having high air pollution) corrosion-enhancing gases and/or aerosols may be contained in the air (e. g. sulfur compounds like sulfur dioxide). Preferably the outdoor sensor network comprises at least one air quality sensor. Alternatively, the air quality may also be captured from external data concerning the application area and/or its surroundings, for example via external air contaminant measurements or via air contaminant simulations.

Beyond this it is proposed that the identified natural hazard risks comprise natural hazard risk predictions, which are created, preferably by data mining, on the basis of previously obtained progressions of the sensor data, and in particular on the basis of previously obtained further information regarding the application area. This advantageously allows achieving a high level of safety. For example, an optimization and/or an optimized confectioning of constructions exposed to natural hazard risks are/is achievable in this way. As a result, a construction may advantageously be designed in such a way that it is capable of surviving events which are to be expected and/or of providing sufficient protection from events which are to be expected. For example, a predictability of future events may be inferred using correlations of different sensor data measured at the time of an event. Examples would be a determination of a precipitation quantity limit value, a wind speed limit value or a wildlife activity limit value, above which an occurrence of a rockfall, in particular of a certain dimension, will be probable. It is for example possible, if a parameter of a natural hazard risk prediction is exceeded or gone below, to give a warning to a provider or manager of a construction, which may for example result in an emergency team or a repair team going into alarm standby mode. For example, the natural hazard risk prediction could be made available to a fire fighters' control room, which may put certain units into increased alert level as long as an increased event probability is predicted by the natural hazard risk prediction. For example, the natural hazard risk prediction may be made available to a railway provider, enabling them to stop a passage of a train through a certain area or to induce a detour as long as an increased event probability is predicted by the natural hazard risk prediction. For example, a natural hazard risk prediction may be provided to an authority responsible for taking care of walking paths, who will have walking paths barred in a certain area as long as an increased event probability is predicted by the natural hazard risk prediction.

It is also proposed that at least one sensor module of the outdoor sensor network is allocated to an application area which is embodied as a catchment and/or stabilization device for rocks, stones, avalanches, debris flows, landslides or the like, and which is in particular embodied as a catchment and/or stabilization construction, wherein the at least one sensor module of the outdoor sensor network comprises an impact sensor for a detection of impacts in the catchment device, wherein an analysis, in particular a pattern recognition, is carried out using the impact data of the impact sensor and/or using the rope force sensor data of a rope force sensor of the sensor module, the rope force sensor data in particular giving measurements of a filling level of a debris flow barrier, together with the measurement series of the tropospheric measurement data of the sensor module, and in particular with the further information regarding the application area, and wherein on the basis of this analysis a natural hazard risk prediction is determined which is realized as an impact prediction. An incorporation of measurement data from the past advantageously allows achieving an improvement of the natural hazard risk prediction. The pattern recognition is in particular implemented as an automated pattern recognition, which is preferably executed by an algorithm of the analysis and/or prediction unit which is based on the principle of machine learning and/or on the principle of neuronal networks. In particular, the natural hazard risk prediction determined in this way is provided to the user group. In particular, the pattern recognition further comprises a recognition of faulty sensors and/or sensor modules of the outdoor sensor network. For example, individual potentially damaged, erroneously calibrated or incorrectly installed sensors and/or sensor modules can be identified by data outliers. The pattern recognition is preferably also based on the principle of crowd-intelligent sensors.

It is further proposed that a maintenance schedule for the application area, for example for a natural hazard prevention installation, is created on the basis of the determined natural hazard risk. This advantageously allows achieving high efficiency, in particular maintenance efficiency, for example in regard to an organization of personnel, material and machines. In particular, the maintenance schedule is provided to the user group. In particular, the maintenance schedule is moreover based on the determined natural hazard risk predictions. In particular, the maintenance schedule is flexibly adapted to changing sensor measurement data. In particular, the maintenance schedule is flexibly adapted to detected events, for example impact events and/or filling events. It is for example conceivable that a certain application area is moved temporally forward in the maintenance schedule after detection of one or several new impact/s or filling event/s, for example debris flows.

If an organization of maintenance personnel, an organization of maintenance gear and/or an organization of expendable materials is done on the basis of determined natural hazard risks of a plurality of application areas, which are in particular distributed arranged in a region, a high maintenance efficiency is advantageously achievable. For example, inspection routes of maintenance teams who check a plurality of application areas on a maintenance run can be optimized in regard to a total driving time and/or in regard to a total driving distance. An "organization of maintenance personnel" is in particular to mean an assignment of application areas to the persons who do the maintenance. Preferably maintenance orders are herein distributed, in particular by the analysis and/or prediction unit, in such a way that in total a workload can be distributed onto the entire personnel available in a region as evenly as possible, and/or that total driving distances of the personnel available in the region can be kept as short as possible. An "organization of maintenance gear" is in particular to mean an assignment of maintenance gear to the persons who do the maintenance. Preferably, maintenance orders are herein distributed, in particular by the analysis and/or prediction unit, in such a way that in total an assignment of maintenance gear to available personnel is distributed in such a way that a preferably short downtime of the maintenance gear and of the personnel is achievable. An "organization of expendable materials" is in particular to mean an assignment of expendable materials to the persons who do the maintenance. Preferably, expendable materials are herein assigned to the available staff, in particular by the analysis and/or prediction unit, in such a way that a preferably small extent of storage is required.

Furthermore, it is proposed that after detection, in particular by the impact sensor, of an impact in a catchment device, in particular in a rockfall barrier, and/or after detection, in particular by the rope force sensor, of a filling event, for example a debris flow, in particular in a debris flow barrier, a maintenance order, in particular implemented as a warning, and/or an immediate repair, in particular implemented as an alert, is triggered depending on an intensity and/or a type of the impact and/or of the filling event. This advantageously enables an appropriate and/or efficient reaction to an occurrence of an event. It is advantageously possible to further increase safety. In particular, in case of an intensity of the impact and/or of the filling event permitting a deduction of a severe damaging of the catchment device (for example by a predeterminable limit value being exceeded or gone below), the alert is triggered, which will preferably result in an (emergency) repair team being sent as soon as possible and/or the application area being barred for non-authorized persons. In particular, in case of an intensity of the impact and/or of the filling event permitting to infer a less severe damaging of the catchment device (for example by way of measurement values within a tolerance range), the warning is triggered, which will preferably lead to an inspection of the application area being brought forward and, if applicable, the respective catchment device being emptied.

It is further proposed that a deployment of a drone, in particular a maintenance drone and/or a reconnaissance drone, is triggered by a result, for example an impact in the rockfall barrier and/or a filling event of the debris flow barrier, and/or by a value of the determined natural hazard risk, in particular the intensity of the impact and/or of the filling event. As a result, advantageously a high level of maintenance efficiency is achievable and/or an organization effort can be kept low. By a "drone" is in particular an unmanned aircraft to be understood which either operates autonomously or is remote-controlled. By a "reconnaissance drone" is in particular a pure sensor drone, in particular camera drone, to be understood, which is configured to do an, in particular optical, assessment and/or check of the application area, in particular the construction. By a "maintenance drone" is in particular a drone to be understood which is configured, in particular in addition to the tasks of the reconnaissance drone, to carry out at least one maintenance activity. The maintenance activity may, for example, be a read-out of data from sensor modules, a charging of energy storages of sensor modules, an exchange of parts (e. g. a battery) of a sensor module, an installation of a sensor module, etc. It is in particular conceivable that the drone acts at least partly autonomously, using the sensor modules which are arranged at an application area for (GPS-independent) navigation, in particular under the principle of a "virtual track", as points of orientation and/or for orientation assistance. By a deployment of the drone being "triggered" is in particular a direct autonomous starting of the drone from a parking position to be understood. Alternatively, by the deployment of the drone being "triggered" is a notification of a person to be understood, who is responsible for a deployment of the drone and who, following the notification, preferably transports the drone to the application area, where he lets the drone start autonomously or by remote control.

Moreover a remote-monitoring sensor device is proposed, with a sensor module for an outdoor sensor network, which is in particular configured to record and provide sensor data for the sensor-network-based analysis and/or prediction method, with at least one outdoor corrosion sensor, with at least one ambient sensor for determining tropospheric measurement data and with at least one communication unit for an, in particular wireless, transmission of the sensor data to an external analysis and/or prediction unit, wherein the sensor module comprises an at least substantially hermetically closed sensor module housing. This advantageously allows obtaining comprehensive and/or significant information regarding natural hazard risks, in particular in an application area or in a plurality of application areas. Advantageously a reliable and/or robust outdoor sensor monitoring is enabled. Advantageously a long-term outdoor monitoring is enabled, which is preferably also permanently functional in locations with particularly rough weather conditions. The outdoor corrosion sensor is in particular embodied as an open-air corrosion sensor, which is preferably configured to detect a corrosivity of an outside atmosphere. The outdoor corrosion sensor is in particular configured to detect a corrosion, preferably a corrosion progress, by measuring a corrosion current. The outdoor corrosion sensor comprises a corrosion surveillance element. The outdoor corrosion sensor is in particular configured for measuring the corrosion current generated by corrosion processes in a corrosion surveillance element that is supported such that it is exposed to the outside atmosphere, preferably for measuring a progression of a current value of the corrosion current. Advantageously, a current flow is detected by the outdoor corrosion sensor which is proportional to the corrosion, in particular to the corrosion protection layer removal rate, in particular of a coating, of the corrosion surveillance element, said current flow in particular allowing to infer a temporal progression of the corrosion protection layer removal rate, an instantaneous corrosion protection layer removal rate, and/or an actual residual material strength of the corrosion protection layer, in particular of the corrosion surveillance element, and thus also of metal parts located in the application area.

The corrosion surveillance element is embodied as a modified ACM (Atmospheric Corrosion Monitor) sensor. In particular, the ACM sensor is configured to determine a corrosivity of surroundings and/or corrosion rates, in particular removal rates, of metals and/or alloys, preferably on the basis of a galvanic current flowing between metals and/or alloy. In particular, the ACM sensor comprises at least two electrodes which, in particular in a dry state, are electrically insulated from each other. These electrodes are in particular implemented at least partially of different materials, preferably metals of different nobilities. It is conceivable that at least one electrode comprises at least one coating, as a result of which in particular at least the surface materials of at least two electrodes differ. Preferably the surface materials are made of metals of different nobilities. Advantageously at least one electrode is implemented substantially identically to at least one portion of a wire of the wire netting. In this way a preferably good transferability of the material removal measured on the corrosion surveillance element to a material removal of the wire netting is advantageously achievable. Advantageously at least one further electrode of the ACM sensor is made at least partially of a material that is nobler than the electrode that is implemented substantially identically to the portion of the wire. The nobler material may in particular be steel, silver, gold, cobalt, nickel, copper, platinum, palladium, a further element situated above zinc in an electro-potential series and/or an alloy situated above zinc in the electro-potential series. In particular, the electrodes, in particular the electrodes having different surface materials, are arranged free of contact to each other. In particular, the electrodes, in particular the electrodes having different surface materials, are free of direct mutual contact. Preferably in a wet state the electrodes, in particular the electrodes having different surface materials, are electrically in contact via water droplets which constitute an electrolyte. In particular, in case of an electrical contact of the electrodes there is a galvanic current flow. The galvanic current flow in particular induces a material removal and/or a corrosion of the less noble electrode. The current flow is advantageously proportional to the material removal. A presence of the electrolyte and/or characteristics, in particular corrosion characteristics, of the electrolyte in particular depend on ambient conditions which the corrosion surveillance element is exposed to at a certain point in time, thus advantageously allowing to infer a corrosivity of the ambient conditions at the point in time.

The ambient sensor comprises at least one thermometer, at least one hygrometer, at least one ombrometer, at least one pyranometer, at least one anemometer, at least one barometer and/or at least one further measuring device, like for example a measuring device for a detection of trace gases, salt concentrations or aerosol concentrations, etc. In particular, the communication unit is configured for an automated, preferably periodic, transmission of the sensor data to the external analysis and/or prediction unit. Preferably the communication unit has a mobile communication capacity. In particular, the communication unit communicates via a mobile communication protocol, for example an EDGE, GPRS, HSCSD and/or preferably via a GSM mobile communication protocol. Additionally or alternatively, however, further wireless interfaces for a communication with the analysis and/or prediction unit are also conceivable. It is also conceivable that the sensor module, in particular the communication unit, comprises further wireless interfaces for a communication with electronic units in the nearby surroundings, for example with further sensor modules of the outdoor sensor network, with drones and/or with external sensors, like for example an external camera, in particular an external Bluetooth camera. The further wireless interface may, for example, comprise a Bluetooth wireless interface, an NFC wireless interface, an RFID wireless interface, a LoRa wireless interface or a comparable short-distance wireless interface. Preferably the communication unit transmits, besides the sensor data, further data regarding the sensor module, for example regarding a location, a time of day, a battery level, a functional status, etc.

By a "substantially hermetically closed sensor module housing" is in particular a sensor module housing to be understood which is closed at least water-tightly, in particular at least with respect to water columns of at least 5 m, preferably at least 25 m, preferentially at least 100 m and especially preferentially at least 250 m. Preferably the at least substantially hermetically closed sensor module housing is also at least substantially airtightly and/or gastightly closed. "At least substantially airtightly and/or gastightly" is in particular to mean that a moisture vapor transmission rate (MVTR) between the inner space of the sensor module housing and the surroundings of the sensor module housing is smaller than 100 $cm^3/m^2/24$ h, preferably smaller than 25 $cm^3/m^2/24$ h, preferentially smaller than 10 $cm^2/m^2/24$ h and especially preferentially smaller than 1 $cm^3/m^2/24$ h.

Alternatively or additionally, "at least substantially airtightly and/or gastightly" is to mean that an oxygen transmission rate (OTR) between the inner space of the sensor module housing and the surroundings of the sensor module housing is smaller than 1000 $cm^3/m^2/24$ h, preferably smaller than 250 $cm^3/m^2/24$ h, preferentially smaller than 100 $cm^3/m^2/24$ h and especially preferentially smaller than 50 $cm^3/m^2/24$ h. The hermetically closed sensor module housing is in particular configured to prevent foreign bodies from entering an interior of the sensor module housing, as a result of which a long lifetime is advantageously achievable. Advantageously the sensor module housing is resistant against damages by vegetation (e. g. against roots or the like entering). Advantageously the sensor module housing is resistant against damaging by a fauna (for example against insects entering, against game bite, or the like). In particular, the sensor module housing accommodates in its interior at least the communication unit, at least one energy storage unit of the sensor module, and/or at least one electronic control and/or regulation unit and/or a computing unit which interacts with the outdoor corrosion sensor, with the ambient sensor, with the communication unit, with the energy storage unit of the sensor module, etc. The hermetically closed sensor module housing in particular comprises at least one, preferably hermetically sealed and/or grouted, pass-through for at least one sensor probe, in particular of the outdoor corrosion sensor and/or of the ambient sensor. By a "remote-monitoring sensor device" is in particular a corrosion and/or impact remote-monitoring device for constructions, in particular for catchment and/or stabilization constructions in the field of natural hazards, to be understood. In particular, the remote-monitoring sensor device is configured to enable a remote monitoring of a construction, in particular a catchment and/or stabilization construction, which is based on data from a plurality of sensor modules. The sensor module is in particular configured to be installed in an application area, which means to be fixed to a terrain or preferentially on a catchment and/or stabilization construction, in particular on a rope, preferably an anchoring rope, of the catchment and/or stabilization construction. Preferably the sensor module is fixedly clamped to the anchoring rope of the catchment and/or stabilization construction.

Beyond this it is proposed that the sensor module housing is implemented free of cable entries, like for example plugs, sockets or cable ducts, free of cable exits, like for example plugs, sockets or cable ducts, free of pressure switches, in particular free of mechanical switches, like for example toggle switches and/or push switches, and free of exterior antennae, like for example plastic-sheathed rod antennae ("rubber sausage") or dipole antennae. This advantageously allows achieving a long lifetime of the sensor module. As a result, the sensor module is advantageously particularly resistant against game bite and/or against other damages caused by wildlife, for example does, stags, martens, boars, mice, rats, etc., which is of great importance in particular in the outdoor application situations of the sensor modules. In particular, an outer side of the sensor module, in particular of the sensor module housing, is at least substantially free of plastic coverings and/or other outside-situated plastic parts. "Substantially free" is in particular to mean, in this context, that less than 25%, preferably less than 15%, advantageously less than 10%, preferentially less than 5% and especially preferentially less than 2% of an outer surface of the sensor module are implemented by plastic. In particular, the outer surface of the sensor module, in particular the sensor module housing, is implemented at least to a major part, preferably by more than 75%, preferentially by more than 90% and especially preferentially by more than 95% of a metal.

It is also proposed that the sensor module, in particular the communication unit, comprises a wireless camera interface for a coupling with an external camera. This advantageously allows obtaining comprehensive and/or significant information regarding natural hazard risks. It is advantageously possible to obtain further information regarding the application area, which can be taken into account, for example, in a sensor-module-internal pre-analysis of the sensor data. As a result, moreover the at least substantially hermetical closure of the sensor module housing can be advantageously maintained. The wireless camera interface is in particular embodied as a Bluetooth interface, preferably as a Bluetooth Low Energy (BLE) interface. However, alternatively or additionally, further wireless interfaces are also conceivable, for example a Near Field Communication (NFC) interface and/or a ZigBee interface.

Furthermore, it is proposed that the remote-monitoring sensor device comprises an external activation and/or deactivation element, which is configured to activate and/or deactivate the sensor module depending on a relative positioning of the external activation and/or deactivation element with respect to the sensor module housing of the sensor module. This advantageously enables a reliable and/or robust outdoor sensor monitoring. Advantageously a controlling is enabled, in particular an activation and/or deactivation of sensor modules independently from external switching elements. The activation and/or deactivation element is preferably embodied as an activation and/or deactivation magnet. However, alternative implementations, for example as a glue-on element, as a clamping element, etc., are also conceivable. The sensor module in particular comprises a detection unit, which is configured to detect a presence of the activation and/or deactivation element in an activation and/or deactivation position. The detection unit is, for example, embodied as a magnetic field sensor. However, alternatively mechanical switchings are also conceivable, whose switching elements are attracted or repelled by the activation and/or deactivation element that is embodied as an activation and/or deactivation magnet, such that a sensor-module-internal switching process is controllable from outside the sensor module housing. In particular, the sensor module is deactivated as long as the external activation and/or deactivation element is in the deactivation position. In particular, the sensor module is activated as long as the external activation and/or deactivation element is in the activation position. For example, the sensor module is deactivated as long as the activation and/or deactivation element is fixed to the sensor module housing, in particular in a deactivation area of the sensor module housing that forms the deactivation position. For example, the sensor module is activated as long as the activation and/or deactivation element is located at a distance from a proximity of the sensor module housing. A vice versa switching is of course also conceivable.

If the communication unit is configured to transmit the sensor data directly, preferably via a communication protocol using a GSM mobile communication standard, in particular without detours via one or several collection point/s for sensor data, to the external analysis and/or prediction unit, which is in particular embodied as a cloud, the external analysis and/or prediction unit being configured to receive sensor data from a plurality of sensor modules which are distributed over different application areas, in particular all over the world, a high level of data safety is advantageously achievable. Advantageously unauthorized acquisition of the sensor data can be made substantially difficult, in particular as for this each individual communication of each sensor module would have to be picked up. It is advantageously possible to do without collection points, which cause additional costs and/or maintenance efforts. Advantageously a high fail-safety of the sensor network is achievable, in particular as at worst individual sensor modules may break down but not entire collection points. It is advantageously possible to simplify an installation and/or set-up of the outdoor sensor network. The communication unit is in particular configured for encoding the transmitted sensor data, preferably by means of an asymmetrical cryptography system. Preferably the private key and/or the public key allocated to a sensor module in the asymmetrical cryptography system are/is already integrated in the sensor module in the factory settings. This allows achieving a particularly high level of data safety. It is further conceivable that, in order to ensure a high manipulation safety, the sensor data are stored in a, preferably encoded, blockchain or in a, preferably encoded, distributed ledger. In particular, the external analysis and/or prediction unit comprises a central communication unit, which is configured to receive sensor data from a plurality of sensor modules of the outdoor sensor network which are distributedly arranged over different application areas, preferably from all sensor modules of the outdoor sensor network.

If moreover, in case of non-accessibility of the external analysis and/or prediction unit, in particular in case of a reduced and/or non-existing connectivity, in particular GSM connectivity, the communication unit is configured to transmit sensor data to a further, preferably neighboring, sensor module of the outdoor sensor network, a particularly extensive coverage of a region is advantageously achievable. An integration of sensor modules which are located in locations with bad or non-existing connectivity into the outdoor sensor network is advantageously achievable. For this it is conceivable that the communication between the sensor modules also takes place via the communication unit, wherein however an alternative communication standard and/or an alternative wireless interface, preferably a wireless interface having a comparably reduced range, like for example LoRa or the like, are/is applied. In particular, the sensor data are forwarded in a chain of sensor modules until reaching a sensor module which has sufficient connectivity for a direct transmission to the external analysis and/or prediction unit.

In addition it is proposed that the sensor module comprises at least one acceleration sensor. In this way a reliable detection of impact events is advantageously enabled. As a result, a correlation of detected impact events with further sensor data, for example the tropospheric measurement data and/or the further information regarding the application area (e. g. external further measurement data), is enabled. In particular, the acceleration sensor implements the impact sensor. The acceleration sensor is configured to detect an acceleration occurring in an impact of an impact body in a catchment and/or stabilization construction that is monitored by at least one sensor module. Preferably the acceleration sensor is at least configured to measure accelerations at least up to 100 g, preferably at least up to 150 g and preferentially at least up to 200 g, wherein 1 g is equivalent to a value of 9.81 m/s². In particular, the acceleration sensor is configured to detect accelerations in all three spatial directions. In particular, the acceleration sensor is configured to detect acceleration directions. The acceleration sensor is in particular embodied an acceleration sensor type known to someone skilled in the art, for example as a piezoelectric acceleration sensor, as a MEMS acceleration sensor, etc. Preferably a function of the acceleration sensor is independent from cables and/or ropes running outside a housing unit of the monitoring device. In particular, the acceleration sensor is arranged completely in the interior of the sensor module housing.

It is further proposed that the sensor module comprises at least one orientation sensor. In this way a high reliability of the sensor data, in particular the outdoor corrosion measurement data, is advantageously achievable. In particular, the orientation sensor is configured to determine an orientation of the sensor module relative to an operative direction of the gravitation force. In particular, the orientation sensor is configured to determine an orientation of the outdoor corrosion sensor relative to the operative direction of the gravitation force. In particular, from a change in orientation following an event, for example following an impact of an impact body, additional information can be obtained regarding the event, for example regarding an impact intensity or impact direction. In particular, using the orientation measurement, a quality and/or reliability of the data of the outdoor corrosion sensor can be ensured, in particular as it is possible to identify faulty orientation of the outdoor corrosion sensor, for example an upside-down position of the outdoor corrosion sensor. If the outdoor corrosion sensor is positioned entirely or partially upside down, possibly no precipitation moisture or too little precipitation moisture gets to the outdoor corrosion sensor, such that the corrosion surveillance element of the outdoor corrosion sensor—in particular in comparison to a metal component that is fully exposed to the total precipitation moisture—will be subject to less corrosion, which means it will generate a smaller amount of corrosion current, and thus a too small corrosion value will be measured. The orientation sensor is in particular embodied as a type of orientation or position sensor that is known to someone skilled in the art. It is in particular conceivable that the orientation sensor implements at the same time the acceleration sensor or vice versa.

It is also proposed that the sensor module comprises at least the rope force sensor. In this way an effective and/or reliable monitoring of constructions comprising ropes, in particular anchoring ropes, is advantageously achievable. A reliable detection of impact events in catchment constructions, like rockfall barriers, and/or filling events in catchment constructions, like debris flow barriers, is advantageously possible. Furthermore, by means of the rope force sensor an intensity of an event, in particular the impact event and/or the filling event, can advantageously be measured. Preferably the rope force sensor is configured to measure rope forces up to 50 kN, advantageously up to 100 kN, especially advantageously up to 150 kN, preferentially up to 200 kN and particularly preferentially up to 294 kN. A function of the rope force sensor is preferably independent from cables and/or ropes running outside a housing unit of the monitoring device. In particular, the rope force sensor is arranged completely in the interior of the sensor module housing.

Beyond this it is proposed that for a measurement of the rope force, the rope force sensor comprises at least one strain gauge strip, which is preferably arranged separately from a rope whose rope forces are monitored by the rope force sensor. In this way a particularly simple and/or uncomplicated measurement of the rope force is advantageously achievable. In particular, the strain gauge strip is configured to determine a deformation of a rope contact element of the sensor module that is caused by an occurring rope force. In particular, the strain gauge strip is arranged in an interior of the sensor module housing. In particular, the strain gauge strip has a temperature response compensation. In particular, the strain gauge strip is embodied as a self-compensating strain gauge strip. In particular, the strain gauge strip is never in a direct contact to the rope that is to be monitored. In particular, the strain gauge strip is arranged on a side of the rope contact element facing towards the interior of the sensor module housing. In particular, the strain gauge strip is arranged on a side of the rope contact element facing away from the rope that is to be monitored.

It is also proposed that the rope force sensor is implemented at least partly integrally with a connection unit of the sensor module, wherein the connection unit is configured for a direct fixation of the sensor module to a construction, preferably to a rope of the construction, preferentially to an anchoring rope of the construction. In this way an especially advantageous and/or compact rope force measurement is enabled. In particular, the connection unit is configured to deflect the rope, in particular the anchoring rope, via the rope contact element in such a way that a force acting onto the rope, i. e. in particular a rope force, deforms the rope contact element in a measurable manner. Advantageously the connection unit is designed universally for different ropes, in particular for ropes having different thicknesses. In particular, by means of the connection unit the sensor module can be mounted at least on ropes with rope thicknesses between 16 mm and 24 mm. An adaption of the connection unit to thicker or thinner ropes is easily possible without deviating from the invention. Advantageously, each construction comprising a rope, in particular an anchoring rope, on which rope forces may occur, is retrofittable with sensor modules. In particular, by means of the connection unit the sensor modules can be mounted on all constructions having ropes, in particular anchoring ropes. By two units being implemented "partly integrally" is in particular to be understood that the units comprise one, in particular at least two, advantageously at least three, common element/s which is/are a component, in particular a functionally relevant component, of both units.

Furthermore, it is proposed that the outdoor corrosion sensor is based on a measurement of a corrosion current flow (shortly denominated "corrosion current") generated by corrosion, wherein the corrosion sensor comprises at least one charge storage, for example a capacitor, which is charged by the corrosion current flow until reaching a charge limit, whereupon the charge storage, in particular the capacitor, discharges, and wherein the sensor module comprises an amperemeter, which is configured for measuring discharge currents of the charge storage, in particular the capacitor, for a determination of the outdoor corrosion measurement data. In this way a particularly precise and/or reliable corrosion measurement is advantageously achievable, in particular as it is also possible to reliably measure low corrosion currents which are, for example, in the μA range. As a result, a measurement of particularly low corrosion currents, in particular in the μA range, generally occurring in the outdoor corrosion sensors used, in particular in sensors of the ACM type, can be measured without excessive technical efforts (e. g. without a zero-ohm amperemeter). Advantageously this enables a particularly cost-efficient implementation of the outdoor corrosion sensor. The corrosion current is in particular a galvanic current.

It is further proposed that the sensor module comprises at least one accumulator, which is configured for a power supply of at least one component of the sensor module, with the corrosion current flow of the outdoor corrosion sensor functioning as a charging current for an electric charging of the accumulator. In this way an especially long battery lifetime is advantageously achievable for the sensor module. Advantageously the sensor module can be operated in a self-sustaining manner for a particularly long time.

Beyond this it is proposed that the sensor module comprises a pre-analysis unit, which is configured to execute at least one close-to-sensor pre-analysis of measurement data, in particular raw measurement data, of at least one of the sensors of the sensor module and/or of at least one external sensor that is coupled with the sensor module, like for example an external camera. This advantageously allows an especially efficient utilization of electrical energy, of which only a limited quantity is available. Advantageously, a data quantity transmitted via the communication unit can be reduced and/or optimized. In this way a lifetime of the sensor module, in particular of the accumulator and/or of a battery of the sensor module, can be optimized, in particular as the data transmission constitutes a large portion of the energy consumption of the sensor module. In particular, the pre-analysis unit is configured to execute a close-to-sensor analysis of the raw measurement data. In particular, the pre-analysis unit is configured to average, summarize and/or process raw data. In particular, the raw data are still stored in the sensor module and can be requested or read out directly on-site for a new analysis or for a quality check by the analysis and/or prediction unit. In particular, the pre-analysis unit is configured to autonomously adapt transmission intervals and/or transmission times of the data transmission to the analysis and/or prediction unit on the basis of the pre-analysis of the raw data. For example, in phases in which, based on the pre-analyzed tropospheric measurement data, generally a low activity (e. g. in regard to corrosion and/or rockfall, etc.) is expected, for example during calm and dry weather conditions, a transmission interval may be increased. In particular, the pre-analysis of the measurement data is configured to reduce a transmitted data quantity as far as possible. In particular, the pre-analysis of the measurement data is configured to reduce a total power consumption of the sensor module. In particular, due to the pre-analysis less energy is consumed than would be saved by dispensing with a transmission of all raw data. The pre-analysis unit is in particular embodied as a computing unit that is allocated to the sensor module. A "computing unit" is in particular to be understood as a unit with an information input, an information processing and an information output. Advantageously the computing unit comprises at least one processor, a memory, input and output components, further electric components, an operation program, regulation routines, control routines and/or calculating routines. Preferably the components of the computing unit are arranged on a shared circuit board and/or are advantageously arranged in a shared housing.

If the pre-analysis unit is moreover configured to do an autonomous selection of which portion of a measurement dataset of a sensor is sent out by the communication unit, and/or if the pre-analysis unit is configured to do an autonomous selection of whether a measurement dataset of a sensor is or is not sent out by the communication unit, an advantageous optimization of energy consumption is achievable. It is for example conceivable that an image recorded by the external camera is compared to previously recorded images by the pre-analysis unit, and that the new image is sent out by the communication unit only if the new image comprises essential changes as compared to the previously recorded image. It is for example conceivable that a dataset of a sensor of the sensor module is sent out by the communication unit only if a further dataset of a further sensor fulfills a certain criterion, e. g. indicates a certain event (for example, the data of the orientation sensor and/or the orientation sensor dataset are/s transmitted only if the data of the acceleration sensor and/or the acceleration sensor dataset allow inferring that an impact event or something like that has taken place).

If the pre-analysis unit is configured to define a transmission interval of the communication unit using measurement data of at least one sensor of the sensor module and/or of at least one external sensor that is coupled with the sensor module, an advantageous optimization of energy consumption is achievable. In particular, the pre-analysis unit shortens the transmission interval in times of increased activity (e. g. increased corrosion, increased rockfall activity, increased wind speeds, increased precipitation, etc.). In particular, the pre-analysis unit increases the transmission interval in times of low activity (e. g. low or no corrosion, low or no rockfall activity, low windspeeds, no precipitation, etc.).

Furthermore, if the pre-analysis unit is configured to define, on the basis of measurement data of at least one sensor of the sensor module and/or of at least one external sensor that is coupled with the sensor module, a regulation of standby phases and/or measurement intervals at least of the sensor and/or of at least one further sensor, which is in particular different from the sensor, an advantageous optimization of energy consumption is achievable. It is for example conceivable that an image is recorded by the external camera only if the measurement data of a further sensor indicate an event, for example an impact or something like that. In particular, in such a case an image recording by the camera is triggered by measurement data of the sensor module which have been determined by a further sensor and have been analyzed in close-to-sensor fashion by the pre-analysis unit. It is for example conceivable that a sensor of the sensor module is activated only if a further dataset of a further sensor fulfills a certain criterion, e. g. indicates a certain event (for example, the orientation sensor is activated only if the data of the acceleration sensor allow inferring that an impact event or the like has taken place). It is for example conceivable that a sensor of the sensor module is put into a standby operation state if no change in the measurement data of the sensor is expected for a long time period (for example, the orientation sensor is put into the standby operation state if no precipitation and no substantial wind force is measured).

In addition, it is proposed that the sensor module comprises a computing unit with a specifically developed operating system, which is not based on existing operating systems and which is in particular configured for a controlling and/or regulation of sensors, of the communication unit, of the pre-analysis unit, etc. In this way a particularly high level of data and/or misuse safety is advantageously achievable. Advantageously, a particularly high safety from hacker attacks, for example by trojans or the like, is achievable, in particular as any malware would have to be purpose-built for the sensor-module-specific operating system. The computing unit is in particular configured for a controlling and/or regulation of sensors, of the communication unit, of the pre-analysis unit, etc. The computing unit in particular at least partly implements the pre-analysis unit.

It is further proposed that the sensor module comprises an energy harvesting unit, which is configured to obtain a current, in particular a charging current for a charging of an accumulator of the sensor module, from a temperature difference, in particular a temperature difference within the sensor module housing. In this way an especially high energy efficiency is advantageously achievable. Advantageously this allows achieving an especially long lifetime of the sensor module. Advantageously, a self-sustenance of the sensor module is increased in this way. In particular, the energy harvesting unit comprises at least one thermo-electric generator. In particular, the thermo-electric generator is based on an exploitation of the Seebeck effect for creating a charging current. In particular, the energy harvesting unit comprises at least one Seebeck element. In particular, the energy harvesting unit is configured to utilize a temperature difference between an upper side of the sensor module housing (directly exposed to solar irradiation) and an underside of the sensor module housing (situated in the shadow of the sensor module) for generating a current and/or voltage.

It is also proposed that the remote-monitoring sensor device comprises at least one further sensor module, which is in particular implemented separately from the sensor module and is allocated to a same application area as the sensor module. In this way a particularly comprehensive and particularly precise monitoring of the application area is advantageously achievable. As a result, it is advantageously possible to take into account that within one and the same application area there may be different conditions, which may, for example, lead to different corrosion intensities (windward side vs. leeward side/rain shadow side of a slope) or which may lead to locally different rockfall frequencies (e. g. gradient/geology of the terrain above). In particular, the remote-monitoring sensor device comprises at least two, preferably at least three, preferentially at least four and especially preferentially more than five sensor modules, which are in each case installed in different locations of the application area. Preferably the sensor modules of the remote-monitoring sensor device, in particular the sensor module and the further sensor module, are implemented at least substantially identically to each other. In particular, all sensor modules of the remote-monitoring sensor device are wirelessly connected to the same analysis and/or prediction unit. In particular, the outdoor sensor network comprises a plurality of remote-monitoring sensor devices each comprising a plurality of sensor modules.

Furthermore, it is proposed that the at least one further sensor module is implemented free of a (local) communi- cation connection to the sensor module. This advanta- geously allows achieving a high level of data safety. Pref- erably, each of the sensor modules of the remote-monitoring sensor device communicates only directly with the analysis and/or prediction unit that is situated outside the application area.

It is moreover proposed that the sensor module comprises a set-up module, which is configured to wirelessly commu- nicate, e. g. via an NFC interface of the communication unit, with an external set-up device, e. g. a smartphone, of an installer for the purpose of a configuration of the sensor module, in particular for an initial configuration of the sensor module and/or for a re-configuration of the sensor module. This advantageously enables a particularly simple installation process. In particular, faults in the installation of the sensor modules, which could lead to erroneous sensor data, are advantageously avoidable. In particular, the sensor module, preferably the communication unit, comprises an interface for a near-field data transmission, for example a Bluetooth interface, a BLE interface or preferentially an NFC interface, which is in particular configured for a communication of the set-up module with the external set-up device.

In addition, it is proposed that the sensor module com- prises a set-up element, for example a QR code, a barcode, an NFC interface or something like that, which can be read out, scanned or actuated by the external set-up device for the purpose of initiating the configuration of the sensor module, in particular the initial configuration of the sensor module and/or the re-configuration of the sensor module. In this way a high degree of user-friendliness is advantageously achiev- able. A risk of faulty installation is advantageously reduc- ible. As a result, high reliability and/or high data quality of the sensor data can be ensured. In particular, after reading out, scanning and/or actuating the set-up element, the installer is guided through an at least semi-automated guided set-up process, during which the external set-up device communicates with the sensor module, preferably via a wireless interface, like for example the NFC interface, and during which preferably configuration data are sent from the external set-up device to the sensor module or vice versa. In particular, the set-up process is directed by an application software (app) installed on the external set-up device. In particular, the installer is guided through the set-up process by the app. In particular, at least a portion of the data exchanged between the external set-up device and the sensor module and/or at least a portion of the configuration data of the configuration of the sensor module are transmitted automatically and wirelessly to the analysis and/or predic- tion unit, preferably after successful execution of the con- figuration, in particular of the initial configuration and/or of the re-configuration.

In particular, the set-up process comprises capturing of the company, in particular the name of the company, who carry out the set-up, and/or capturing the installer, in par- ticular a personnel number and/or name of the installer, who carries out the set-up. In particular, the set-up process comprises capturing of the application area, for example the project name, the project number, the denomination of the construction, etc. In particular, the set-up process comprises (fully automated) capturing of an identifier of the sensor module, for example a serial number or registration number. In particular, the set-up process comprises capturing of geographic coordinates, for example GPS coordinates, of the sensor module, in particular of the installation location of the sensor module. Preferably the geographic coordinates are captured via a geotracking function, in particular a GPS function, of the external set-up device. However, it is generally also conceivable that the sensor module comprises a GPS sensor. To receive geographic coordinates which are as accurate as possible, the installer may be requested in the set-up process, when capturing the geographic coordinates, to bring the external set-up device into a predetermined position relative to the sensor module, for example in contact with a certain surface of the sensor module. In particular, the set-up process comprises capturing a time zone, a date and/or a time of day. Preferably herein the set time zone, the device date and/or the device time of the external set-up device are/is adopted. In particular, the set-up process comprises capturing an exact installation position of the sensor module on a construction, in particular an exact fixation position of the sensor module on the catchment and/or stabilization construction. In particular, the set-up process comprises capturing an exact designation, in par- ticular type designation, of the construction, in particular the catchment and/or stabilization construction which the sensor module is fixed to. In particular, the set-up process com- prises capturing images, in particular photographs, of the installation situation, in particular fitting-in situation, of the sensor module. The images are preferably made by means of the external set-up device. Alternatively, the images could also be made by a camera of the sensor module or by the external camera, which is in a wireless communication connection with the sensor module. In particular, the set-up process comprises capturing a diameter of the rope of the construction, in particular of the catchment and/or stabili- zation construction, which the sensor module is fixed to via the connection unit.

Moreover, the outdoor sensor network is proposed, with a plurality of remote-monitoring sensor devices comprising different application areas and respectively comprising sen- sor modules which are allocated to the different application areas and which in each case communicate wirelessly, in particular directly, with a shared external analysis and/or prediction unit, and which in each case are preferably in a wireless direct communication connection with a shared analysis and/or prediction unit. As a result, advantageously comprehensive and/or significant information regarding natural hazard risks, in particular in an application area or in a plurality of application areas, can be obtained, processed and/or implemented into activities and/or into instructions for activities.

Furthermore, a construction is proposed, in particular a natural hazard prevention installation, preferably a catchment and/or stabilization construction, like for example a rockfall barrier, an avalanche defense, a rockfall drapery, a slope securing, a debris flow barrier and/or an attenuator, said construction comprising at least one rope, in particular an anchoring wire rope, and at least one sensor module of a remote-monitoring sensor device, the sensor module being fixed to the rope. This advantageously allows obtaining comprehensive and/or significant information regarding natural hazard risks of the construction and/or in nearby surroundings of the construction. The construction in particular comprises at least one further rope. In particular, a further sensor module of the remote-monitoring sensor device is fixed to the further rope. It is also conceivable that more than two sensor modules of the remote-monitoring sensor device are allocated to the construction, in particular that more than two sensor modules of the remote-monitoring sensor device are fixed to the construction.

The analysis and/or prediction method according to the invention and/or the remote-monitoring sensor device according to the invention are/is herein not to be limited to the application and implementation described above. In particular, in order to fulfill a functionality that is described here, the analysis and/or prediction method according to the invention and/or the remote-monitoring sensor device according to the invention may comprise a number of individual elements, components, method steps and units that differs from a number given here.

BRIEF DESCRIPTION OF DRAWINGS

Further advantages will become apparent from the following description of the drawings. In the drawings one exemplary embodiment of the invention is illustrated. The drawings, the description and the claims contain a plurality of features in combination. Someone skilled in the art will purposefully also consider the features separately and will find further expedient combinations.

It is shown in.

DETAILED DESCRIPTION

Figure 1:
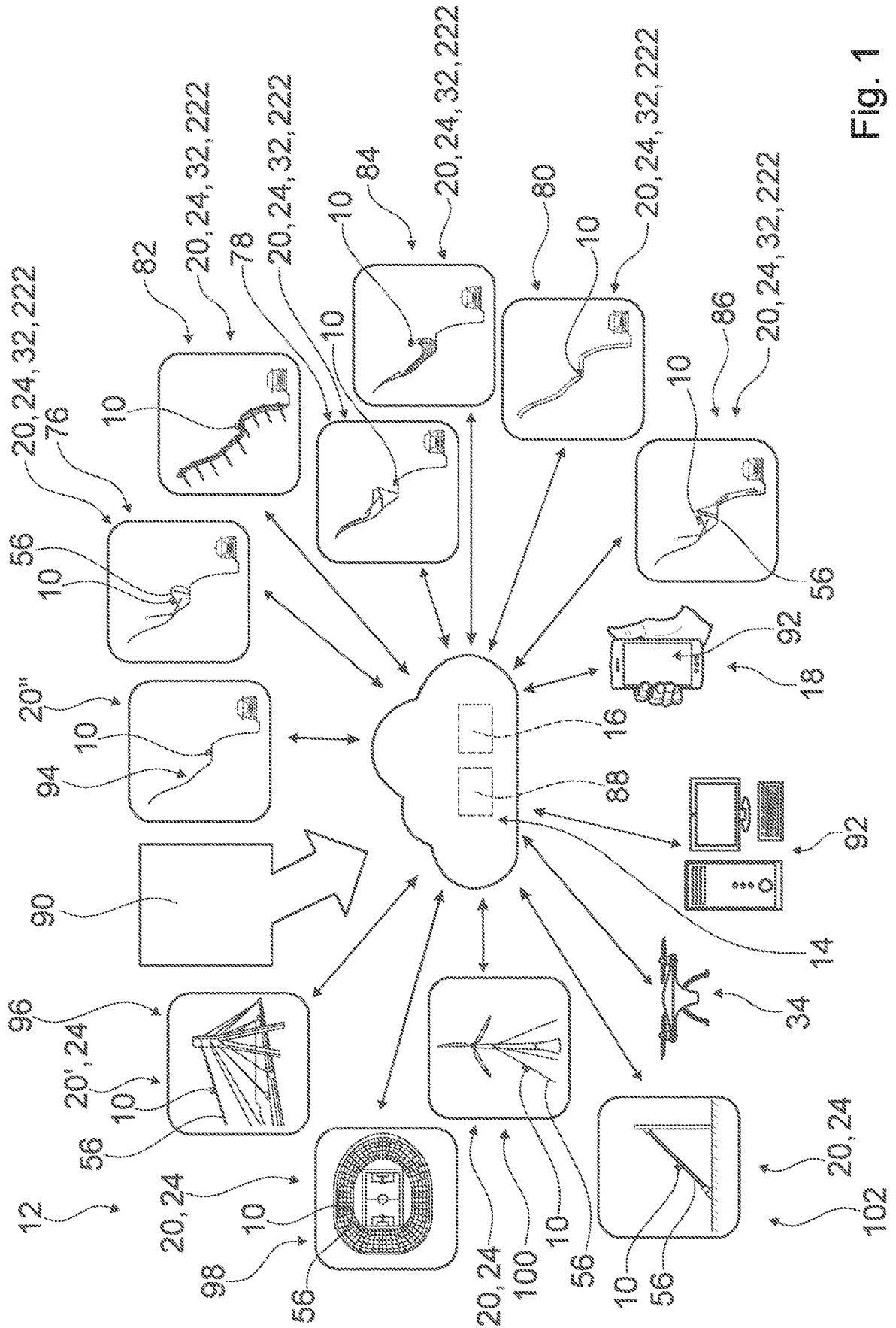
FIG. 1 a schematic illustration of an outdoor sensor network with remote-monitoring sensor devices, FIG. 2 a schematic illustration of an application area of a remote-monitoring sensor device of the outdoor sensor network, which is embodied as a construction, FIG. 3 a schematic side view of a sensor module of the remote-monitoring sensor device, which is fixed to a rope of the construction, FIG. 4 a further schematic, perspective view of the sensor module of the remote-monitoring sensor device, FIG. 5 a schematic flow chart of a set-up process of the sensor module, FIG. 6 a schematic flow chart of an analysis and/or prediction method, which is based on the outdoor sensor network, for a protection from natural hazards, and FIG. 7 a schematic flow chart of a method for a close-to-sensor analysis, close to the sensor, of sensor data by the sensor modules.

FIG. 1 shows a schematic illustration of an outdoor sensor network 12. The outdoor sensor network 12 is at least configured to record sensor data for a sensor-network-based analysis and/or prediction method that is described below. The outdoor sensor network 12 comprises a plurality of remote-monitoring sensor devices 36 (cf. FIG. 2). The outdoor sensor network 12 extends over a plurality of different application areas 20. The application areas 20 may be arranged distributedly all over the world. Respectively one remote-monitoring sensor device 36 is in each case allocated to one of the different application areas 20. Each of the remote-monitoring sensor devices 36 comprises a sensor module 10 or a plurality of sensor modules 10, which is/are thus also fixedly allocated to the respective application areas 20. FIG. 1 further shows an external analysis and/or prediction unit 14, which can in particular also be allocated to the outdoor sensor network 12. The external analysis and/or prediction unit 14 is embodied as a cloud. Alternatively, however, the external analysis and/or prediction unit 14 could also be embodied as a single central server or as a server compound. The remote-monitoring sensor devices 36, preferably the sensor modules 10 of the respective remote-monitoring sensor devices 36, communicate wirelessly with the external analysis and/or prediction unit 14. The remote-monitoring sensor devices 36, preferably the sensor modules 10 of the respective remote-monitoring sensor devices 36, communicate directly with the external analysis and/or prediction unit 14. The remote-monitoring sensor devices 36, preferably the sensor modules 10 of the respective remote-monitoring sensor devices 36, communicate with the external analysis and/or prediction unit 14 via a direct GSM mobile communication data connection. The same external analysis and/or prediction unit 14 communicates with all sensor modules 10 of all remote-monitoring sensor devices 36 of the outdoor sensor network 12. The external analysis and/or prediction unit 14 is configured for receiving sensor data from a plurality of sensor modules 10, 10', 10", which are distributed over different application areas 20, 20', 20". The external analysis and/or prediction unit 14 comprises a communication device (not shown) for a communication with the outdoor sensor network 12.

The external analysis and/or prediction unit 14 realizes a shared external analysis and/or prediction unit 14 of all sensor modules 10 of the outdoor sensor network 12. The external analysis and/or prediction unit 14 collects the determined sensor data from all sensor modules 10 of the outdoor sensor network 12. The external analysis and/or prediction unit 14 comprises a memory unit 16 with at least one data storage medium. The external analysis and/or prediction unit 14 is configured for storing the collected sensor data of the sensor modules 10 of the outdoor sensor network 12 in the memory unit 16. The external analysis and/or prediction unit 14 is configured to receive, collect and/or store further data from databases 90, which are external in regard to the sensor network 12. The further data from the databases 90, which are external in regard to the sensor network 12, comprise, among other things, further information regarding the application area 20.

The external analysis and/or prediction unit 14 comprises a processor unit 88 with at least one processor. The external analysis and/or prediction unit 14 comprises an operation program, which is configured for a processing of the collected and/or stored data and which can be called up and executed by the processor unit 88. The external analysis and/or prediction unit 14 is configured to analyze and/or process the collected and/or stored data using the operation program. The external analysis and/or prediction unit 14 is configured to bring the collected and/or stored data into a relationship to each other using the operation program. The external analysis and/or prediction unit 14 is configured to carry out a pattern recognition on the basis of the collected and/or stored data.

The external analysis and/or prediction unit 14 is configured to provide a user group 18 with the data processed and processed by means of the operation program and/or with the unprocessed data received from the sensor modules 10. The user group 18 may, for example, access the external analysis and/or prediction unit 14, in particular a user portal ("dashboard") of the external analysis and/or prediction unit 14, via a display device 92 which may be embodied, among others, as a PC or as a smartphone. Alternatively it is also conceivable that the external analysis and/or prediction unit 14 sends data to the user group 18, in particular to display devices 92 of the user group 18 (for example in the form of notifications). It is moreover conceivable that the user group 18 comprises a drone 34.

Some of the application areas 20 are constructions 24. At least one of the application areas 20 is herein a construction 24 comprising metal components which are exposed to atmospheric corrosion. The metal components of the construction 24 are, for example, ropes 56 (cf. FIG. 2), in particular with anchoring wire ropes 228. Some of the application areas 20 implemented by constructions 24 are natural hazard prevention installations 32. An exemplary application area 20 of FIG. 1 is embodied as a rockfall barrier 76. The rockfall barrier 76 comprises a rope 56, which a sensor module 10 is fixed to. A further exemplary application area 20 of FIG. 1 is embodied as an avalanche defense 78. The avalanche defense 78 comprises a rope 56, which a sensor module 10 is fixed to. A further exemplary application area 20 of FIG. 1 is embodied as a rockfall drapery 80. The rockfall drapery 80 comprises a rope 56, which a sensor module 10 is fixed to. A further exemplary application area 20 of FIG. 1 is embodied as a slope securing 82. The slope securing 82 comprises a rope 56, which a sensor module 10 is fixed to. A further exemplary application area of FIG. 1 is embodied as a debris flow barrier 84 and/or debris flow blockage. The debris flow barrier 84 and/or the debris flow blockage comprises a rope 56, which a sensor module 10 is fixed to. A further exemplary application area 20 of FIG. 1 is embodied as an attenuator 86. The attenuator 86 comprises a rope 56, which a sensor module 10 is fixed to. Some of the application areas 20 embodied as constructions 24 are different from natural hazard prevention installations 32. An exemplary application area 20 of FIG. 1 is embodied as a suspension bridge 96. The suspension bridge 96 comprises a rope 56, which a sensor module is fixed to. A further exemplary application area 20 of FIG. 1 is embodied as a stadium roof anchoring 98. The stadium roof anchoring 98 comprises a rope 56, which a sensor module 10 is fixed to. A further exemplary application area 20 of FIG. 1 is embodied as a wind wheel anchoring 100, in particular as a wind wheel mast anchoring. The wind wheel anchoring 100, in particular the wind wheel mast anchoring, comprises a rope 56, which a sensor module 10 is fixed to. A further exemplary application area 20 of FIG. 1 is embodied as a façade anchoring 102. The façade anchoring 102 comprises a rope 56, which a sensor module 10 is fixed to. Some further application areas 20 are locations without constructions, like for example a slope 94.

Figure 2:
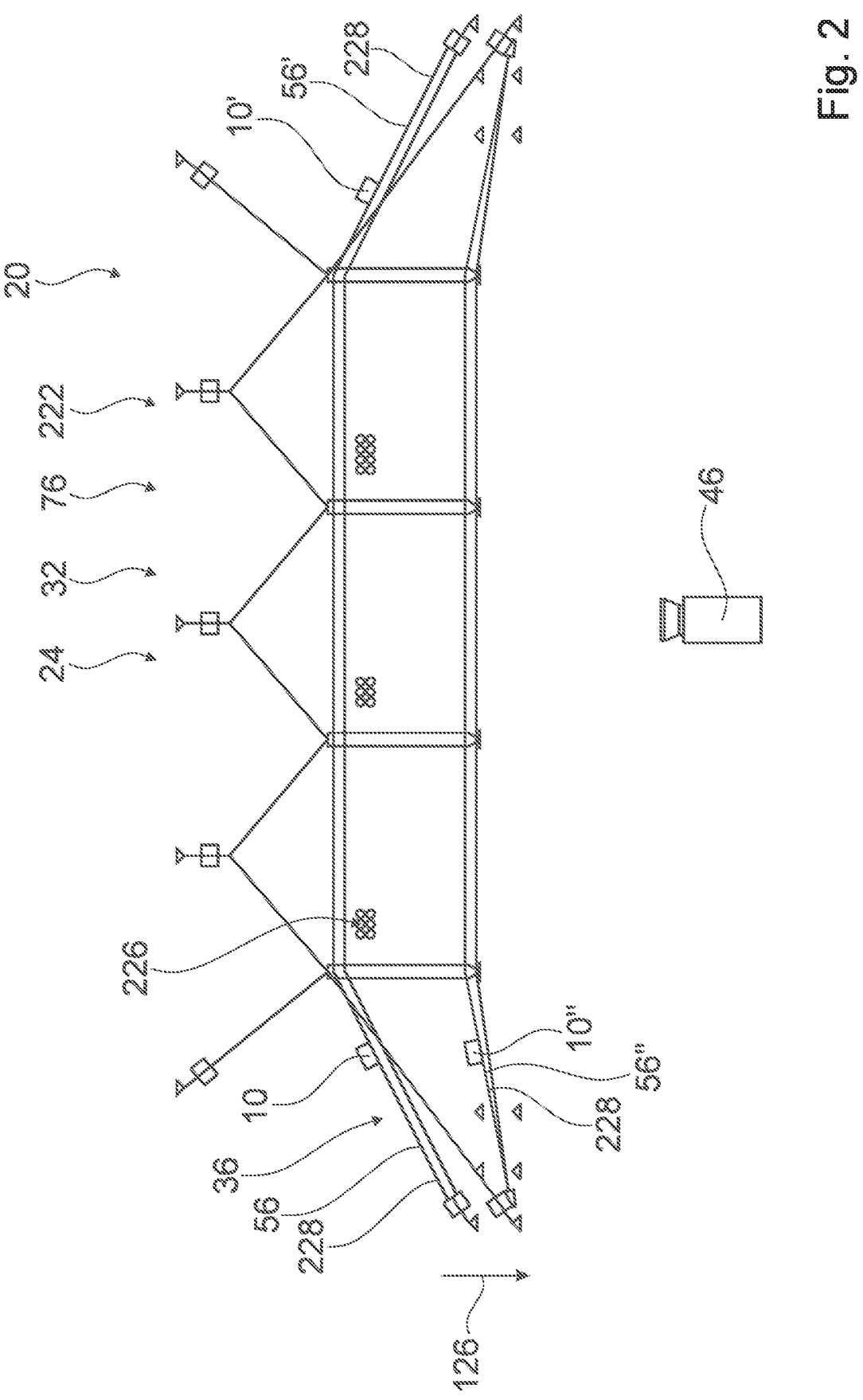

FIG. 2 exemplarily shows a schematic view of one of the application areas 20 which are embodied as constructions 24. The construction 24 illustrated in FIG. 2 is embodied as a natural hazard prevention installation 32. The construction 24 illustrated in FIG. 2 is embodied as a catchment and/or stabilization device 222, in particular as a catchment and/or stabilization construction. The construction 24 illustrated in FIG. 2 is embodied as a rockfall barrier 76. The rockfall barrier 76 comprises a wire netting 226, which is, as an example, embodied as a ring net and is shown in FIG. 2 only section-wise. The rings of the ring net are in this case embodied by the meshes of the wire netting 226. A diameter of the rings of the ring net therefore constitutes the mesh size of the wire netting 226. The application area 20, in particular the rockfall barrier 76, comprises the remote-monitoring sensor device 36. The remote-monitoring sensor device 36 allocated to the application area 20, in particular the rockfall barrier 76, exemplarily comprises three sensor modules 10, 10', 10". The sensor modules 10, 10', 10" are respectively fixed to different ropes 56, 56', 56" of the rockfall barrier 76. The sensor modules 10, 10', 10" are respectively arranged in different regions of the rockfall barrier 76. One sensor module 10 of the sensor modules 10, 10', 10" is arranged, viewed from a front view of the rockfall barrier 76, in an upper lefthand end region of the rockfall barrier 76. A further sensor module 10' of the sensor modules 10, 10', 10" is arranged, viewed from a front view of the rockfall barrier 76, in an upper righthand end region of the rockfall barrier 76. An additional further sensor module 10" of the sensor modules 10, 10', 10" is arranged, viewed from a front view of the rockfall barrier 76, in a lower lefthand end region of the rockfall barrier 76. Alternative arrangements of sensor modules 10, 10', 10" and/or arrangements of further sensor modules 10, 10', 10" on the rockfall barrier 76 are conceivable. The ropes 56, 56', 56" are in each case anchoring wire ropes 228 of the rockfall barrier 76. In case of an impact of an impact body (not shown) in the rockfall barrier 76, rope forces are exerted onto the ropes 56, 56', 56". The sensor modules 10, 10', 10" are in each case arranged, in particular viewed relative to a gravitation direction 126, on an upper side of the respectively allocated rope 56, 56', 56".

Figure 3:
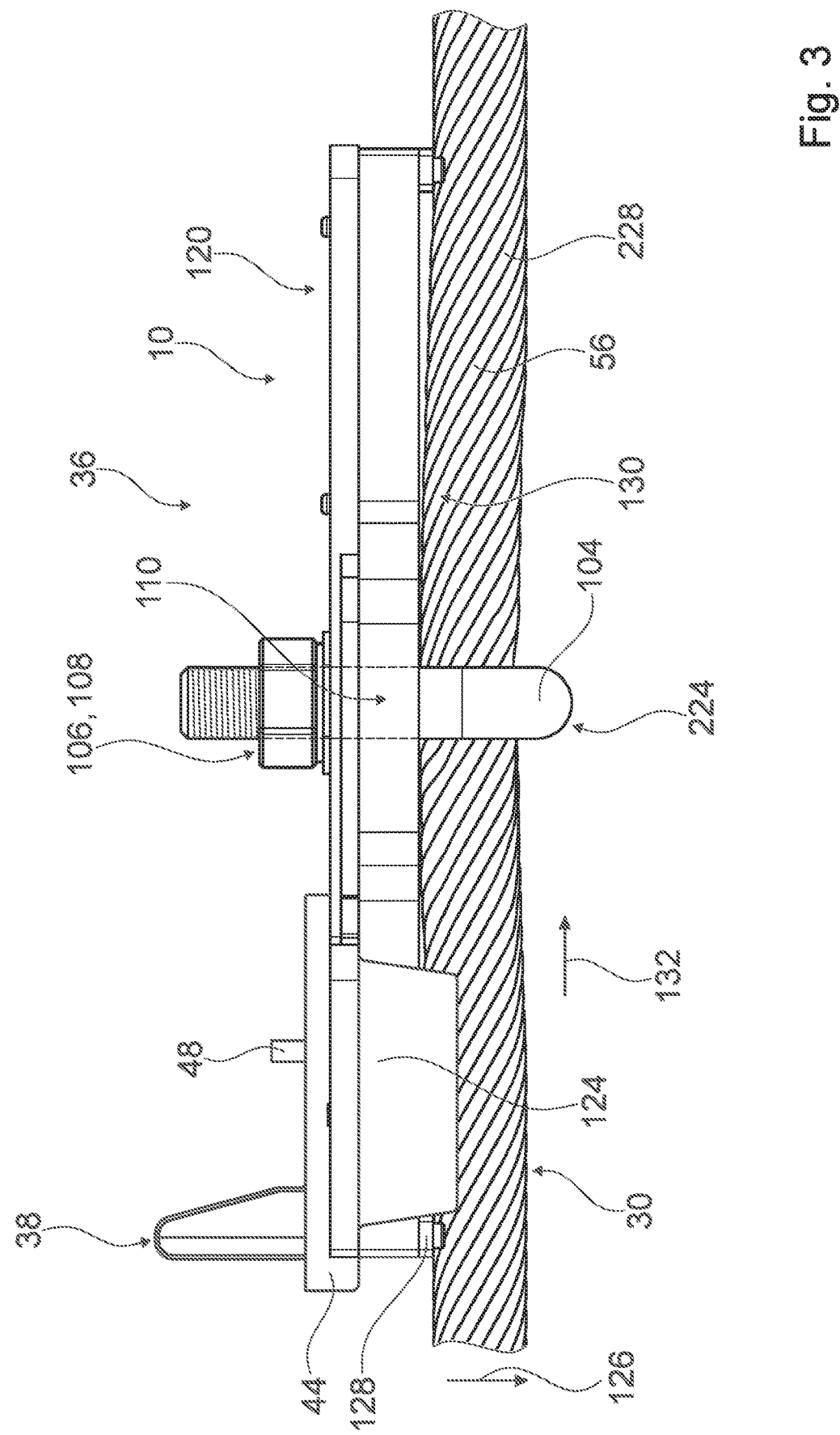

FIG. 3 shows a schematic side view of a sensor module 10 of the remote-monitoring sensor device 36, which is fixed to a rope 56. The sensor module 10 comprises a connection unit 224. The connection unit 224 is configured for a direct fixation of the sensor module 10 on the rope 56 of the construction 24. The connection unit 224 comprises a rope receiving element 104. The rope receiving element 104 is embodied as a U-hook. The connection unit 224 comprises a tension element 106. The connection unit 224 comprises a further tension element 108. The tension elements 106, 108 are embodied as nuts. The rope receiving element 104 has on each end a thread for screwing the tension elements 106, 108 on. For a fixation of the sensor module 10 on the rope 56, the rope receiving element 104 is put over the rope 56, is guided through tunnel-like recesses 110 within the sensor module 10 and is secured on a side of the sensor module 10 that is situated opposed to the rope 56 by screwing the tension elements 106, 108 onto the rope receiving element 104. The tension elements 106, 108 are screwed onto the rope receiving element 104 tightly such that a side of the rope 56 is pressed to an outer side of the sensor module 10 by the rope receiving element 104. The connection unit 224 is configured to fix the sensor module 10 to the rope 56 in such a way that it is slip-resistant relative to a longitudinal axis of the rope 56. The connection unit 224 is configured to fix the sensor module 10 to the rope 56 in such a way that it is rotationally fixed relative to a longitudinal axis of the rope 56.

Figure 4:
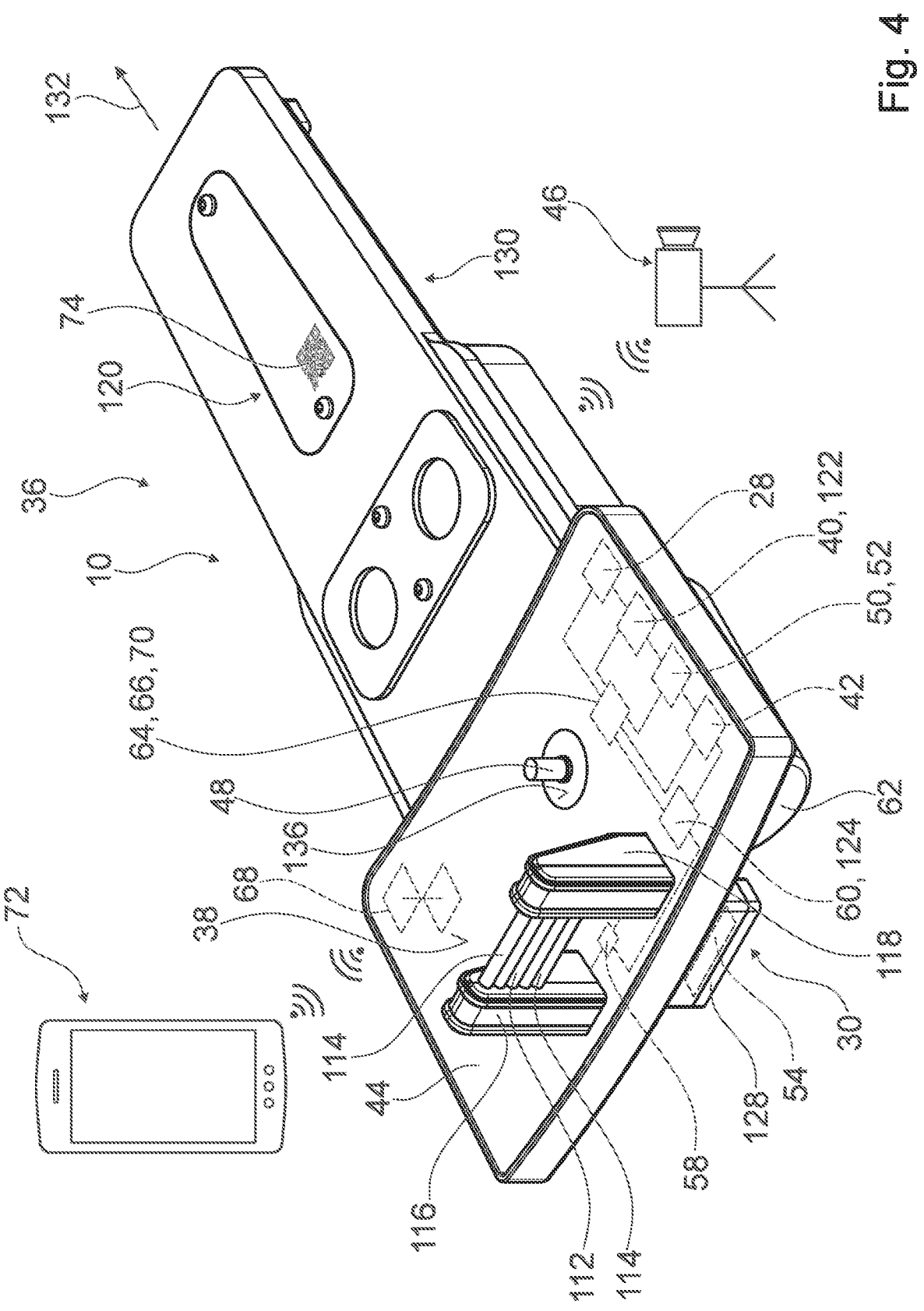

FIG. 4 shows as schematic perspective view of the sensor module 10 of the remote-monitoring sensor device 36 (without the connection unit 224), in particular of an upper side 120 of the sensor module 10. The illustrated sensor module 10 is configured for a usage in the outdoor sensor network 12.

The sensor module 10 comprises an outdoor corrosion sensor 38. The outdoor corrosion sensor 38 is configured for measuring outdoor corrosion measurement data. The outdoor corrosion sensor 38 is configured for measuring a corrosion intensity. The outdoor corrosion sensor 38 is configured for measuring a corrosion protection layer removal rate. The outdoor corrosion sensor 38 is embodied as an ACM sensor. The outdoor corrosion sensor 38 comprises electrodes 112, 114. In the case that is shown by way of example, the outdoor corrosion sensor 38 comprises exactly five electrodes 112, 114. The electrodes 112, 114 are aligned in parallel to one another. In each case two electrodes 114 are arranged in a shared plane above, respectively below a central electrode 112. The central electrode 112 forms an anode. The other electrodes 114 form a cathode. The electrodes 112, 114 have outer shapes which are at least substantially identical to each other. Surfaces of the electrodes 114, which form the cathode, comprise a metal of higher nobility than a surface of the central electrode 112, which forms the anode. In the case that is shown by way of example, the surface of the electrodes 114 forming the cathode is made of a steel while the surface of the electrode 112 forming the anode is made of zinc, in particular a zinc coating of a steel wire. Between the electrodes 112, 114, the outdoor corrosion sensor 38 embodied as an ACM sensor in each case has an air gap. The air gap acts as an insulator. Between the electrodes 114 of the cathode and the electrode 112 of the anode there is a distance of maximally 0.4 mm, preferably maximally 0.3 mm and preferentially no more than 0.2 mm. Between the electrodes 114 of the cathode there is also a distance of maximally 0.4 mm, preferably maximally 0.3 mm and preferentially no more than 0.2 mm. On its lateral ends the outdoor corrosion sensor 38 has two end caps 116, 118, which are implemented as insulators. The end caps 116, 118 serve as a holding for the electrodes 112, 114. Electrical contacts of the electrodes 112, 114 are guided within the end caps 116, 118. The end caps 116, 118 and/or the pass-throughs of the electrical contacts of the electrodes 112, 114 into an interior of a sensor module housing 44 of the sensor module 10 are at least substantially hermetically sealed. Because of the air gap, the connection from anode to cathode is current-free in a dry state. When the outdoor corrosion sensor 38 gets wet, for example due to condensation moisture or precipitation moisture, a current can flow due to conductive particles, for example ions, which are dissolved in water and which in particular come from one of the electrodes 112, 114. This current flow is driven by different redox potentials of the different materials of the electrode 112 of the anode and the electrodes 114 of the cathode. In case of a current flow, material is removed from the anode. The current flow is proportional to a material removal. The current flow depends on the type and quantity of chemical substances dissolved in water. For example, an increasing quantity of salts, for example sulfates or sodium chloride, will result in an increased current flow. The outdoor corrosion sensor 38 is arranged on the upper side 120 of the sensor module 10. For a measurement of the corrosion current flow generated by corrosion, the outdoor corrosion sensor 38 comprises at least one charge storage 58. The charge storage 58 is implemented as a capacitor. The charge storage 58 is charged by the corrosion current flow until reaching a charge limit. When the charge storage 58 has been charged by the corrosion current flow up to the charge limit, the charge storage 58 discharges in a current pulse. The sensor module 10, in particular the outdoor corrosion sensor 38, comprises an amperemeter 60. The amperemeter 60 is configured for measuring the current pulses generated by the discharge currents of the charge storage 58. The sensor module 10 is configured to determine the outdoor corrosion measurement data from the current pulses generated by the discharge currents of the charge storage 58.

The sensor module 10 comprises an acceleration sensor 50. The acceleration sensor 50 is arranged in the interior of the sensor module housing 44. The acceleration sensor 50 is configured to detect commotions of the sensor module 10. The sensor module 10 comprises an orientation sensor 52. The orientation sensor 52 is configured to detect a relative orientation of the sensor module 10, in particular a relative orientation of the upper side 120 of the sensor module 10 with respect to the gravitation direction 126. The sensor module 10 comprises a rope force sensor 30. The rope force sensor 30 is configured to detect a force acting onto the rope 56, which the sensor module 10 is fixed to. The rope force sensor 30 comprises a strain gauge strip 54. The sensor module 10 comprises a rope contact element 128. The rope force sensor 30 comprises the rope contact element 128. The rope contact element 128 is arranged on an outer side, in particular an underside 130, of the sensor module 10. The strain gauge strip 54 is configured for an indirect measurement of the rope force by a degree and/or an extent of a deformation of the rope contact element 128 of the sensor module 10 caused by the rope 56. The strain gauge strip 54 is arranged separately from the rope 56 whose rope forces are to be monitored via the rope force sensor 30. The strain gauge strip 54 is arranged on a side of the rope contact element 128 that is opposed to the rope 56. The strain gauge strip 54 is arranged on an inner side of the sensor module housing 44, in particular in the interior of the sensor module housing 44. The rope force sensor 30 is implemented at least partly integrally with the connection unit 224 of the sensor module 10. Surfaces, in particular rope contact surfaces, of the sensor module 10 in a (nearby) region of the rope contact element 128 and in a (nearby) region of the connection unit 224 are situated in different planes, which are preferably parallel to each other. The rope contact surfaces of the rope contact element 128 and of the connection unit 224 are arranged along a longitudinal direction 132 of the sensor module 10 and/or of the rope 56. The rope 56 is spaced apart from each other via the rope contact surfaces of the rope contact element 128 and of the rope 56 and/or of the sensor module 10. By the rope 56 being adjacent to the sensor module 10 in the region of the rope contact element 128 and in the region of the connection unit 224, the rope 56 is deflected from a straight course. The connection unit 224 and/or the rope contact element 128 are configured to deflect the rope 56 section-wise. By the connection unit 224 substantially contributing to the deflection of the rope 56, the connection unit 224, in particular the rope receiving element 104, constitutes a substantial portion of the rope force sensor 30. Due to a rope force which acts, in particular pulls, on the rope 56, the rope 56, which is preferably deflected via the rope contact element 128 and the connection unit 224, is re-deflected out of the deflection. By a rope force which acts, in particular pulls, on the rope 56, the rope contact element 128 is bent. In the exemplary embodiment shown, the rope contact element 128 is embodied as a metal bar, in particular an aluminum bar. The strain gauge strip 54, which is arranged on the rope contact element 128, in particular on an inner side of the rope contact element 128, is (unevenly) stretched or compressed by the bending of the rope contact element 128. From the expansion of the strain gauge strip 54 the rope force sensor 30 determines the rope force that causes the bending of the rope contact element 128.

The sensor module 10 comprises an energy storage unit 124. The energy storage unit 124 may be implemented as a battery, in particular as a battery having a minimum service life of 10 years under normal conditions. However, in the example illustrated in FIG. 4 the energy storage unit 124 is implemented as an accumulator 62. The energy storage unit 124 is configured at least for a power supply of at least one component of the sensor module 10, for example of at least one of the sensors of the sensor module 10 and/or of at least one computing unit 66 of the sensor module 10. In the case shown byway of example, the corrosion current flow of the outdoor corrosion sensor 38 serves as a charging current for an electrical charging of the accumulator 62. The sensor module 10 comprises an energy harvesting unit 68. The energy harvesting unit 68 is configured to obtain a current from a temperature difference within the sensor module 10, preferably within the sensor module housing 44. The energy harvesting unit 68 comprises a thermo-electrical generator for producing power.

The sensor module 10 comprises an ambient sensor unit 122. The ambient sensor unit 122 comprises at least one ambient sensor 40, preferably a plurality of ambient sensors 40, for example thermometer, hygrometer, ombrometer, pyranometer, anemometer, barometer and/or at least further measuring devices, like measuring devices for a detection of trace gases, salt concentrations or aerosol concentrations, etc. The ambient sensor unit 122, in particular the ambient sensor 40, is configured to measure tropospheric measurement data. The sensor module housing 44 is hermetically closed. The sensor module housing 44 is configured for a hermetical separation of the interior of the sensor module housing 44 from the surroundings. At least one of the ambient sensors 40 comprises a measuring probe (not shown), which protrudes from the sensor module housing 44 of the sensor module 10. The measuring probe is hermetically grouted such that the hermetic closure is maintained. The sensor module housing 44 is implemented free of cable entries. The sensor module housing 44 is implemented free of cable exits. The sensor module housing 44 is implemented free of pressure switches.

The sensor module housing 44 is implemented free of mechanical switches. The sensor module housing 44 is implemented free of exterior antennae.

The sensor module 10 comprises a communication unit 42. The communication unit 42 is configured for a wireless and/or direct transmission of sensor data, in particular of the ambient sensor unit 122 and/or of the outdoor corrosion sensor 38, to the external analysis and/or prediction unit 14. The communication unit 42 is configured to transmit the sensor data, without detours via one or several collection point/s for sensor data, from the respective sensor module 10 to the shared external analysis and/or prediction unit 14. The communication unit 42 comprises a GSM receiving and transmitting module. The communication unit 42 is equipped with a SIM card permitting a data transfer of a data volume of approximately 10 years' continuous operation of all sensors of the sensor module 10 (approximately 1 GB). The communication unit 42 is implemented free of exterior antennae. The communication unit 42 comprises an integrated antenna.

The sensor module 10, in particular the communication unit 42, comprises a wireless camera interface. The wireless camera interface is configured for a coupling with an external camera 46. The external camera 46 may be embodied, for example, as a wildlife camera and/or as a surveillance camera monitoring the sensor module 10 and/or the construction 24. The external camera 46 is in particular embodied as a Bluetooth camera. The remote-monitoring sensor device 36 and/or the outdoor sensor network 12 comprise/ comprises the external camera 46. It is also conceivable that the communication unit 42 has a further communication interface with a reduced transmission range, which is configured, in case of inaccessibility of the external analysis and/or prediction unit 14, to transmit the sensor data to a further, preferably neighboring, sensor module 10' of the outdoor sensor network 12, which is allocated to the same application area 20 or which is allocated to a further, in particular neighboring, application area 20.

The sensor module 10 comprises the computing unit 66. The computing unit 66 is configured for checking, controlling and/or regulating internal functions of the sensor module 10, for example of sensors of the sensor module 10, of external sensors, like for example the external camera 46, of the communication unit 42, for example for an encoding of the sensor data sent by the communication unit 42, etc. The computing unit 66 comprises a specifically developed operating system of its own, which is not based on existing operating systems.

The sensor module 10 comprises a pre-analysis unit 64. The pre-analysis unit 64 is implemented integrally with the computing unit 66. The pre-analysis unit 64 is configured to carry out a close-to-sensor pre-analysis of measurement data, in particular raw measurement data, of at least one of the sensors of the sensor module 10. The pre-analysis unit 64 is configured to carry out a dose-to-sensor pre-analysis of measurement data, in particular raw measurement data, of at least one external sensor that is coupled with the sensor module 10, like for example the external camera 46. The pre-analysis unit 64 is configured to do an autonomous selection of which portion of a measurement dataset of a sensor is sent out by the communication unit 42. The pre-analysis unit 64 is configured to do an autonomous decision whether a measurement dataset of a sensor is or is not sent out by the communication unit 42. The pre-analysis unit 64 is configured to define a transmission interval of the communication unit 42 using measurement data of at least one sensor of the sensor module 10 and/or of at least one external sensor that is coupled with the sensor module 10, like for example the external camera 46. The pre-analysis unit 64 is configured, using measurement data of at least one sensor of the sensor module 10 and/or of at least one external sensor that is coupled with the sensor module 10, like for example the external camera 46, to define a regulation of standby phases and/or measurement intervals at least of the sensor and/or of at least one further sensor.

The remote-monitoring sensor device 36 comprises an external activation and/or deactivation element 48. The external activation and/or deactivation element 48 is configured to activate and/or deactivate the sensor module 10 depending on a relative positioning of the external activation and/or deactivation element 48 with respect to the sensor module housing 44. The external activation and/or deactivation element 48 is embodied as an external activation and/or deactivation magnet, which is magnetically attracted at least by a portion of the sensor module housing 44 and/or which has a magnetically attracting effect at least onto a portion of the sensor module housing 44. The sensor module housing 44 comprises an activation and/or deactivation surface 136. The activation and/or deactivation surface 136 comprises a magnetic material, preferably a ferromagnetic material. As long as the external activation and/or deactivation element 48 is arranged on the sensor module housing 44 in the region of the activation and/or deactivation surface 136, the sensor module 10 is in a deactivated state. As long as the external activation and/or deactivation element 48 is arranged on the sensor module housing 44 outside the region of the activation and/or deactivation surface 136 and/or as long as the external activation and/or deactivation element 48 is completely spaced apart from the sensor module housing 44, the sensor module 10 is in an activated state. A vice-versa modus operandi is of course also conceivable. Depending on whether the external activation and/or deactivation element 48, in particular the activation and/or deactivation magnet, is or is not arranged in the region of the activation and/or deactivation surface 136, the sensor module 10 is in the activated state or in the deactivated state (or vice versa).

The sensor module 10 comprises a set-up module 70. In order to bring about a configuration of the sensor module 10, the set-up module 70 is configured for a wireless communication with an external set-up device 72, for example a smartphone, of an installer. The sensor module 10, in particular the set-up module 70, comprises a set-up element 74, which can be read out or actuated by the external set-up device 72 for an initiation of the configuration of the sensor module 10. In the example illustrated in FIG. 4, the set-up element 74 is realized as a QR code. In the case shown the QR code is applied on the sensor module housing 44. The set-up module 70 is configured, in particular in cooperation with the external set-up device 72, for an implementation of an at least semi-automated set-up process 134 (cf. FIG. 5).

Figure 5:
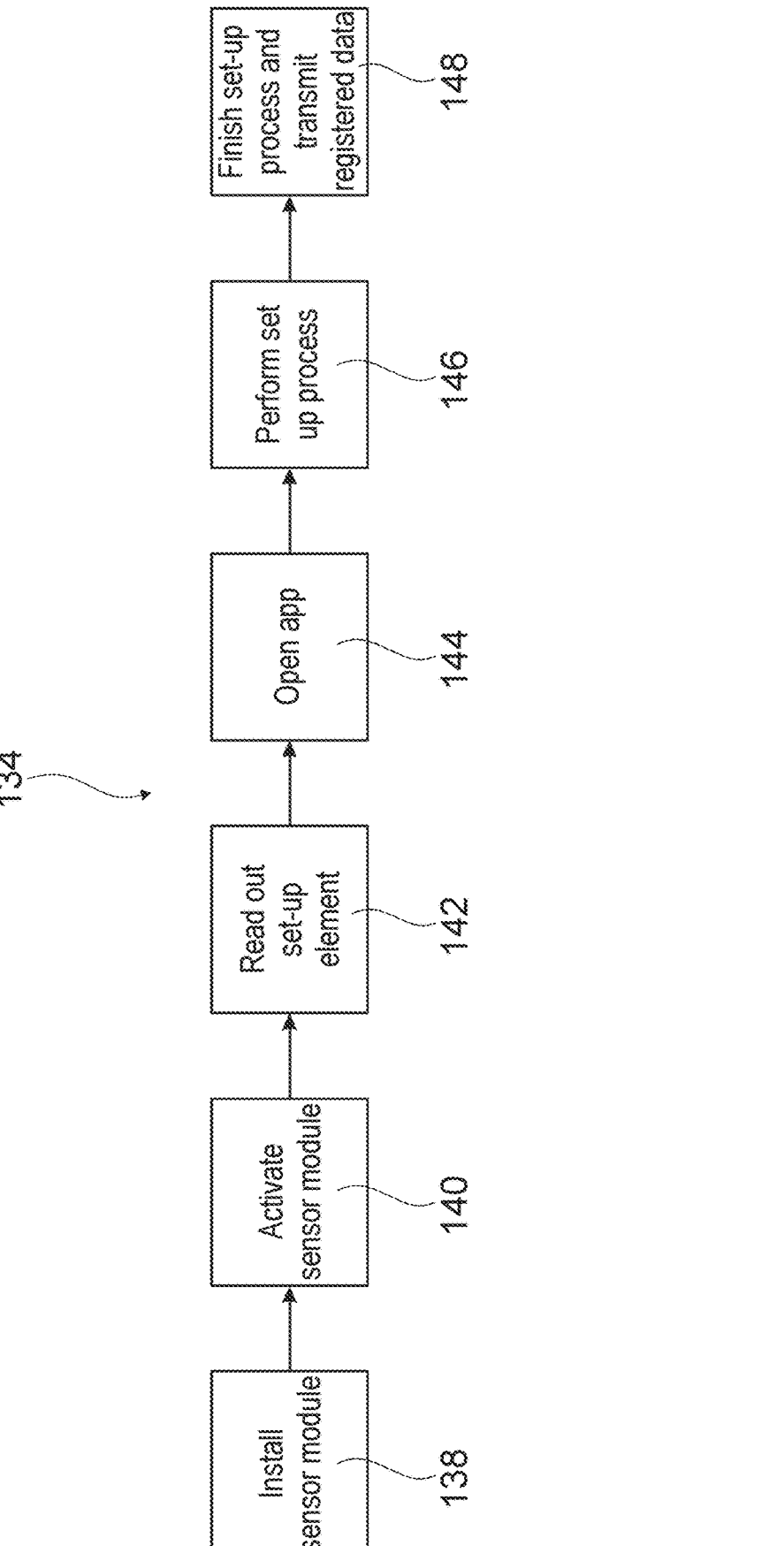

FIG. 5 shows a schematic flow chart of the at least semi-automated set-up process 134. In at least one set-up step 138 the sensor module 10 is brought into an application area 20 and is installed on/in the application area 20. In at least one further set-up step 140 the sensor module 10 is activated. For the activation the activation and/or deactivation element 48 is, for example, removed from the region of the activation and/or deactivation surface 136 in the set-up step 140. In at least one further set-up step 142 the set-up element 74 is read out. In the set-up step 142 the QR code applied on the sensor module housing 44 is, for example, scanned by the external set-up device 72. It is conceivable that basic data of the sensor module 10 are already contained in the set-up element 74, said basic data being then automatically integrated into the set-up process 134 that is executed by means of the set-up module 70. In at least one further set-up step 144 an app on the external set-up device 72 opens automatically. In the set-up step 144 the basic data of the sensor module 10 already obtained from the set-up element 74 (e. g. serial number, type of sensor module, etc.) are automatically incorporated in the app. In at least one further set-up step 146 an, in particular step-wise, set-up process is started, which is directed by the app. In the set-up process 134 directed by the app, the above-described features of the sensor module 10, of the installer, of the application area 20, etc. are registered. In at least one further set-up step 148 the set-up process is finished and the registered data are (directly and wirelessly) transmitted to the external analysis and/or prediction unit 14 by the communication unit 42 and/or by the external set-up device 72.

Figure 6:
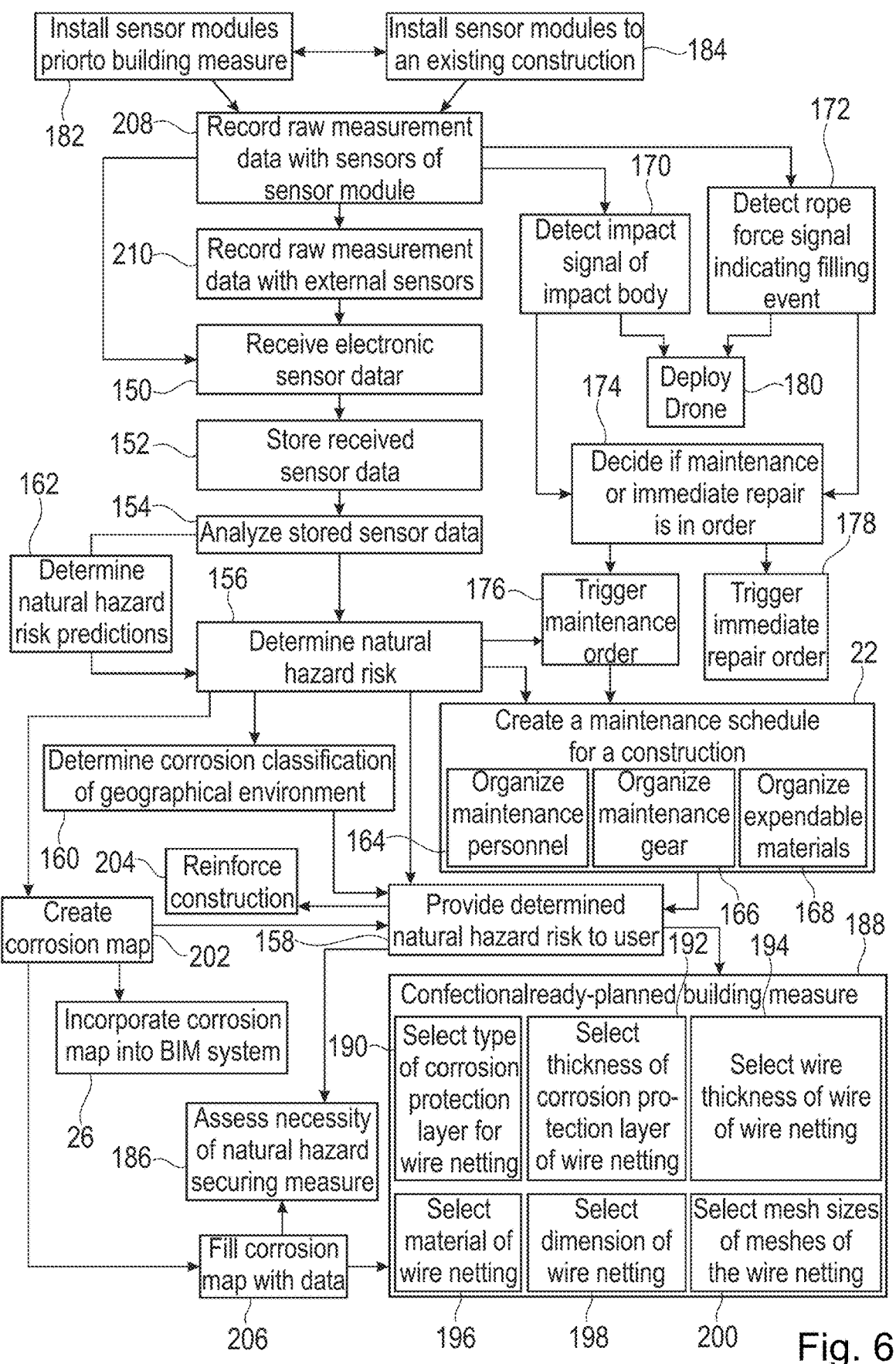

FIG. 6 shows a schematic flow chart of the sensor-network-based analysis and/or prediction method for a protection from natural hazards.

In at least one method step 182 the sensor modules 10, 10', 10" of the outdoor sensor network 12 are installed in an application area 20 prior to a natural hazard securing measure or prior to a planned building measure. Herein the sensor modules 10, 10', 10" of the outdoor sensor network 12 can be installed in the surroundings of the application area 20, for example on the slope 94, which were up to now free of natural hazard securing measures, for a determination of a local necessity of a natural hazard securing measure. Alternatively or additionally, in at least one further method step 184 the sensor modules 10, 10', 10" of the outdoor sensor network 12 are installed in an application area 20 implemented as an already built construction 24. Herein the sensor modules 10, 10', 10" of the outdoor sensor network 12 are fixed to the construction 24, in particular on ropes 56 of the construction 24.

In at least one further method step 150 the electronic sensor data of the distributedly arranged sensor modules 10, 10', 10" of the outdoor sensor network 12 are received by the external analysis and/or prediction unit 14. Herein the external analysis and/or prediction unit 14 collects the received sensor data. The received and collected sensor data comprise at least outdoor corrosion measurement data, impact sensor data, rope force sensor data and tropospheric measurement data. The tropospheric measurement data are herein in each case allocated to a set of corrosion measurement data, a set of impact sensor data and a set of rope force sensor data. In at least one further method step 152 the received and collected sensor data of the outdoor sensor network 12 are stored in the memory unit 16 of the shared external analysis and/or prediction unit 14. In at least one further method step 154 the received, collected and stored sensor data of the outdoor sensor network 12 are analyzed by the external analysis and/or prediction unit 14 for a determination of a natural hazard risk in the respective application areas 20, 20', 20" of the sensor modules 10, 10', 10" of the outdoor sensor network 12. At least one further information regarding the respective application area 20, which is different from the outdoor corrosion measurement data, from the impact sensor data, from the rope force sensor data and from the tropospheric measurement data, is directly integrated in the analysis of the sensor data that is executed in the method step 154.

In at least one further method step 156 a natural hazard risk is determined on the basis of the analysis of the sensor data of the external sensor network 12 together with the further information regarding the application areas 20, 20', 20". A further information regarding the application area 20, which is directly integrated in the analysis executed in the method step 154, may be an intensity of a wildlife activity and/or of an anthropogenic activity, like for example a walkers' activity, in nearby surroundings of the application area 20. Increased wildlife activity and/or increased anthropogenic activity will result in an augmentation of the natural hazard risk that is determined in the method step 156. An additional further information regarding the application area 20, which is directly integrated in the analysis executed in the method step 154, may be air quality data from nearby surroundings of the application area 20. An increased concentration of certain air contaminants will lead to an augmentation of the natural hazard risk that is determined in the method step 156.

In at least one further method step 158 the natural hazard risk determined by the external analysis and/or prediction unit 14 is provided to an authorized user group 18. The natural hazard risk determined in the method step 156 and provided in the method step 158 comprises a remaining lifetime of constructions 24, which has been determined on the basis of the sensor data. The natural hazard risk determined in the method step 156 and provided in the method step 158 comprises a corrosion protection layer removal rate of corrosion-protection-coated metal components, for example wire ropes 228, which has been determined on the basis of the sensor data. In at least one further method step 160, using the determined corrosion protection layer removal rate, a corrosion classification is defined of a geographical environment of the application area 20, 20', 20", in particular an environment of each sensor module 10 that is installed on the respective application area 20. For this purpose, from the real outdoor corrosion measurement data determined over a long time period (e. g. at least a month, at least a year or at least two years) an average corrosion protection layer removal rate is obtained which, for an assignment to a respectively appropriate corrosion class, is matched to standardized corrosion protection layer removal rates allocated to corrosion classifications (for example according to the standard ISO 12944-1:2019-01).

In at least one further method step 162 natural hazard risks are determined which comprise natural hazard risk predictions. In the method step 162 the natural hazard risk predictions are obtained on the basis of previously determined progressions of the sensor data. Alternatively or additionally, in the method step 162 the natural hazard risk predictions are obtained on the basis of previously determined further information regarding the application area 20. In the method step 162, on the basis of the sensor data and/or the further information a pattern recognition is carried out, in which sensor data progressions of individual sensors and/or correlations of sensor data progressions of different sensors are determined, which permit a deduction of an augmentation or reduction of the natural hazard risk, for example a rockfall risk. In the method step 162, among others, a pattern recognition is carried out using the impact data of the impact sensor 28 and/or the rope force sensor data of a rope force sensor 30 of the sensor module 10, together with the measurement series of the tropospheric measurement data of the sensor module 10 and/or together with the further information regarding the application area 20, on the basis of which a natural hazard risk prediction is obtained that is realized as an impact prediction. In the method step 162 a data mining is carried out of the sensor data collected and stored by the external analysis and/or prediction unit 14, preferably in a combination with the further information regarding the application areas 20 collected and stored by the analysis and/or prediction unit 14.

In at least one further method step 186, on the basis of the natural hazard risk determined in particular in the method step 156, and/or on the natural hazard risk prediction obtained in particular in the method step 162, an assessment is executed of a necessity of implementing the natural hazard securing measure in the application area 20, up to then free of natural hazard securing measures, with the sensor modules 10 installed in the method step 182.

In at least one further method step 188 a confectioning of an already-planned building measure, comprising an installation of a wire netting 226 and/or of a wire rope 228, is carried out depending on the determined natural hazard risk. In at least one method substep 190 of the method step 188, a selection of a type of a corrosion protection layer of the wire netting 226 and/or of the wire rope 228 is done on the basis of the determined natural hazard risk, in particular on the basis of the determined corrosion protection layer removal rate. In at least one method substep 192 of the method step 188, a selection of a thickness of the corrosion protection layer of the wire netting 226 and/or of the wire rope 228 is done on the basis of the determined natural hazard risk, in particular on the basis of the determined corrosion protection layer removal rate. In at least one method substep 194 of the method step 188, a selection of a wire thickness of the wire netting 226 and/or of the wire rope 228 is done on the basis of the determined natural hazard risk, in particular on the basis of the determined natural hazard risk prediction (for example the expected frequency and/or intensity of events). In at least one method substep 196 of the method step 188, a selection of a material of the wire netting 226 and/or of the wire rope 228 is done on the basis of the determined natural hazard risk, in particular on the basis of the determined natural hazard risk prediction (for example the expected frequency and/or intensity of events). In at least one method substep 198 of the method step 188, a selection of a dimension of the wire netting 226 is done on the basis of the determined natural hazard risk, in particular on the basis of the determined natural hazard risk prediction (for example the expected locations for an occurrence of events). In at least one method substep 200 of the method step 188, a selection of a mesh size of meshes of the wire netting 226 is done on the basis of the determined natural hazard risk, in particular on the basis of the determined natural hazard risk prediction (for example the type of events).

In at least one further method step 22 a maintenance schedule for the application area 20, preferably for the construction 24, is created on the basis of the natural hazard risk determined in the method step 156. The maintenance schedule is obtained depending on the determined remaining lifetimes of the construction 24, in particular of certain components of the construction 24. In the method step 22 a maintenance sequence of a plurality of separately located constructions 24 is defined. The maintenance sequence is defined following an order of precedence of the different constructions 24, which is determined on the basis of the corrosion state of the construction 24 and/or of the remaining lifetime of the construction 24. Moreover, a maintenance time is appointed for the construction 24 in the method step 22. The maintenance time is appointed on the basis of the measured corrosion state of the construction 24 and/or of the measured remaining lifetime of the construction 24. The maintenance time is flexibly adapted to the measured corrosion state of the construction 24 and/or to the measured remaining lifetime of the construction 24 if substantial changes of these values occur over time.

In at least one method substep 164 of the method step 22, an organization of maintenance personnel is implemented on the basis of the determined natural hazard risks of a plurality of application areas 20. The appointed maintenance times are herein distributed to the maintenance personnel in such a way that a preferably even workload is achievable for the maintenance personnel. The appointed maintenance times are herein distributed to the maintenance personnel of different maintenance stations in such a way that a preferably short travel time to the constructions 24 that are to be maintained is achievable. The appointed maintenance times are herein distributed to the maintenance personnel in such a way that the maintenance procedures that are to be carried out can be adapted exactly to individual skills of the maintenance personnel. In at least one further method substep 166 of the method step 22, an organization of maintenance gear is implemented on the basis of the determined natural hazard risks of a plurality of application areas 20. Available maintenance gear is herein distributed to the appointed maintenance times in such a way that a preferably even utilization of the maintenance gear is achievable. The available maintenance gear is herein distributed to the different maintenance stations in such a way that a preferably short downtime of the maintenance gear, e. g. due to travelling to the constructions 24 that are to be maintained, is achievable. Herein the individual skills of the maintenance personnel for an operation of the respective maintenance gear are taken into account when distributing the available maintenance gear to the available maintenance personnel. In at least one further method substep 168 of the method step 22, an organization of expendable materials is implemented on the basis of determined natural hazard risks of a plurality of application areas 20. Ordering and/or delivery of expendable materials are/is herein adapted to the appointed maintenance times in such a way that a preferably small-scale storage is necessary. An assignment of expendable materials to maintenance personnel is herein adapted to the forthcoming maintenance times such that a total quantity of expendable materials taken on a maintenance trip can be kept as small as possible.

In at least one method step 170 an impact signal indicating an impact of an impact body is detected by at least one impact sensor 28 of a sensor module 10 allocated to an application area 20 which is realized as a rockfall barrier 76. Alternatively, in at least one method step 172 a rope force signal indicating a filling event, in particular a debris flow, is detected by at least one rope force sensor 30 of a sensor module 10 allocated to an application area 20 which is realized as a debris flow barrier 84. In at least one further method step 174, after detection of the impact in the method step 170 and/or after detection of the filling event in the method step 172, depending on an intensity and/or a type of the impact and/or of the filling event a, preferably automated, decision is made—in particular by the analysis and/or prediction unit 14—whether to trigger a maintenance order or an immediate repair. In at least one further method step 176 a maintenance order is triggered. The maintenance order is triggered if the intensity measured by the sensor modules 10 of the impact and/or of the filling event allows inferring that the rockfall barrier 76 and/or the debris flow barrier 84 were/was not severely damaged by the impact and/or by the filling event, and/or that they/it were/was damaged only to such an extent that there is still a sufficient protective effect against potential further events. The maintenance order is triggered if the type measured by the sensor module 10 of the impact and/or of the filling event, i. e. for example the progression of the sensor data received during the event, allows inferring that the rockfall barrier 76 and/or the debris flow barrier 84 were/was not severely damaged by the impact and/or by the filling event, and/or that they/it were/was damaged only to such an extent that there is still a sufficient protective effect against potential further events. In at least one further method step 178 an immediate repair order is triggered. The immediate repair order is triggered if the intensity measured by the sensor modules 10 of the impact and/or of the filling event permits inferring that the rockfall barrier 76 and/or the debris flow barrier 84 were/was severely damaged by the impact and/or by the filling event, and/or that they/it were/was damaged to such an extent that a protective effect against potential further events is no longer sufficient. The immediate repair order is triggered if the type measured by the sensor modules 10 of the impact and/or of the filling event, i. e. for example the progression of the sensor data received during the event, permits inferring that the rockfall barrier 76 and/or the debris flow barrier 84 were/was severely damaged by the impact and/or by the filling event, and/or that they/it were/was damaged to such an extent that a protective effect against potential further events is no longer sufficient.

In at least one further method step 180, which may in particular be applied in support of the decision-making of the method step 174 but may as well be realized at any other time, a deployment of a drone 34 is triggered by a result and/or by a value of the determined natural hazard risk. The drone 34 is embodied as a maintenance drone or as a reconnaissance drone. Depending on the intensity and/or the type of an impact in a rockfall barrier 76 and/or of a filling event of a debris flow barrier 84, in the method step 180 a, preferably automated, decision is made—in particular by the analysis and/or prediction unit 14—to initiate or not to initiate the deployment of the drone 34.

In at least one further method step 202 a corrosion map is created indicating corrosion data and comprising at least the application area 20, on the basis of the natural hazard risk determined in the method step 156. For this purpose, in the method step 202 the geographic coordinates of the respective sensor modules 10 installed in the application area 20 are integrated as the further information regarding the application area 20. The corrosion map shows a distribution of the corrosion data, in particular the corrosion intensities, over a geographical extent of the application area 20 and/or over an extent of a construction 24 implementing the application area 20. In at least one further method step 26 the corrosion map is incorporated into a BIM system (Building Information Modeling System) of an application area 20, which is for example realized as a natural hazard prevention installation 32. In at least one further method step 204 an, in particular local, optimization of the application area 20, which is for example realized as a natural hazard prevention installation 32, is carried out on the basis of the obtained corrosion map. In the method step 204, for example, a portion of a rockfall barrier 76 or of a slope securing 82 or the like is reinforced. Herein, for example, the portion of the rockfall barrier 76, of the slope securing 82, or the like, is equipped with a wire netting 226 and/or a wire rope 228 having an increased tensile strength, an increased thickness of a corrosion protection coating, an increased wire thickness, etc. In at least one further method step 206 the corrosion map is filled beyond surroundings of the application area 20, i. e. in particular in an area without sensor modules 10, 10', 10" of the outdoor sensor network 12, with simulated corrosion data. In the method step 206 the corrosion data of the areas of the corrosion map which are located beyond the surroundings of the application area 20, i. e. which are in particular free of sensor modules 10, 10', 10" of the outdoor sensor network 12, are obtained on the basis of sensor data of sensor modules 10, 10', 10" in neighboring application areas 20'. Alternatively or additionally, in the method step 206 the corrosion data of the areas of the corrosion map which are located beyond the surroundings of the application area 20, i. e. which are in particular free of sensor modules 10, 10', 10" of the outdoor sensor network 12, are obtained on the basis of sensor data of sensor modules 10, 10', 10" in geographically and/or climatologically similar application areas 20".

Figure 7:
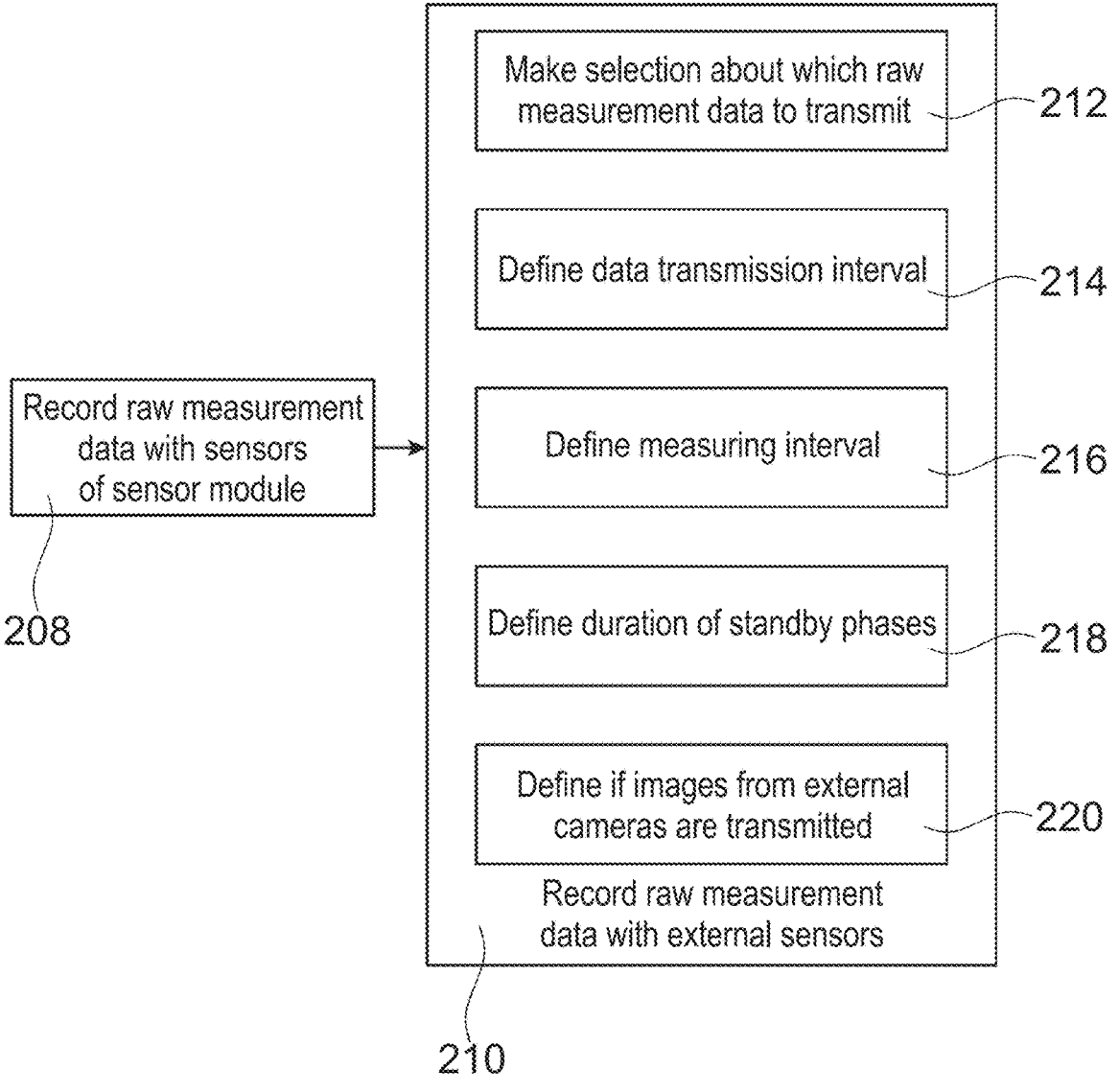

FIG. 7 shows a schematic flow chart of a method for a close-to-sensor (pre-) analysis of the sensor data by the sensor modules 10. In at least one method step 208 the raw measurement data are recorded by the sensors of the sensor module 10. In the method step 208, moreover raw measurement data are recorded by external sensors which are coupled with the sensor module 10, for example by the external camera 46. In at least one further method step 210 the raw measurement data are analyzed in terms of data processing by the sensor-module-internal pre-analysis unit 64. In at least one method substep 212 of the method step 210, an autonomous selection is done by the pre-analysis unit 64 on the basis of the analysis of the raw measurement data, which portion of the raw measurement data is transmitted to the analysis and/or prediction unit 14. In the method substep 212 it is decided for each raw measurement data point and/or for each raw measurement dataset whether this raw measurement data point and/or this raw measurement dataset is transmitted to the analysis and/or prediction unit 14. In at least one further method substep 214 of the method step 210, on the basis of the analysis of the raw measurement data a transmission interval is defined, in which the communication unit 42 establishes a data transmission connection to the analysis and/or prediction unit 14. In at least one further method substep 216 of the method step 210, on the basis of the analysis of the raw measurement data a measuring interval of one or several of the sensors of the sensor module 10 is defined. In at least one further method substep 218 of the method step 210, a duration of standby phases of one or several sensors of the sensor module 10 is defined on the basis of the analysis of the raw measurement data. In at least one further method substep 220 of the method step 210 it is defined, on the basis of a sensor-module-internal analysis of the images of the external camera 46, whether or not the respective images are transmitted to the analysis and/or prediction unit 14. In the method substep 220 newly taken images are compared to reference images, for example previously taken images of the same image detail. Here a new image is transmitted to the analysis and/or prediction unit 14 if there is an essential deviation of the new image from the reference image. A new image is here not transmitted to the analysis and/or prediction unit 14 if there is essential congruency of the new image with the reference image.

The invention claimed is:

1. A sensor-network-based analysis and/or prediction method for a protection from natural hazards, comprising at least method steps of:

Providing an outdoor sensor network comprising sensor modules that are distributedly arranged, and which are fixed to ropes of one or more catchment and/or stabilization devices for rocks, stones, avalanches, debris flows or landslides, the sensor modules each comprising:

acceleration sensors for a detection of impact sensor data in a form of accelerations occurring in an impact of an impact body in a respective catchment and/or stabilization device of the one or more catchment and/or stabilization devices, leading to commotions of the sensor modules of the respective catchment and/or stabilization device and/or rope force sensors for a detection of rope force sensor data in the form of rope pulling forces at ropes of a plurality of respective catchment and/or stabilization devices including the respective catchment and/or stabilization device, the sensor modules each further comprising:

open-air corrosion sensors for a determination of outdoor corrosion measurement data in the form of a corrosivity of an outside atmosphere in an area of the respective catchment and/or stabilization device, Providing an external analysis and/or prediction unit, implemented separately from the sensor modules and implemented as a computer or a computer network, comprising at least one processor, at least one memory unit and at least one operation program that can be called up from the at least one memory unit by the at least one processor, Receiving and collecting outdoor corrosion measurement datasets with the outdoor corrosion measurement data and impact measurement datasets with the impact sensor data and/or rope force measurement datasets with the rope force sensor data from the sensor modules in the external analysis and/or prediction unit, Capturing geographic coordinates of the respective catchment and/or stabilization device or loading pre-captured geographic coordinates of the respective catchment and/or stabilization device, Receiving tropospheric measurement datasets and allocating the tropospheric measurement datasets which are received geographically to respective sensor modules of the sensor modules of the outdoor sensor network, wherein the tropospheric measurement datasets which are received comprise data allowing a deduction of at least one parameter of a troposphere surrounding a respective sensor module of the respective sensor modules, Geographically associating and allocating each of the outdoor corrosion measurement datasets which are received and each of the impact measurement datasets which are received and/or each of the rope force measurement datasets which are received with the geographic coordinates that are captured or loaded, Storing datasets of the outdoor sensor network including the outdoor corrosion measurement datasets, the impact measurement datasets, the rope force measurement datasets, and/or the tropospheric measurement datasets which are received in the at least one memory unit of the external analysis and/or prediction unit, Determining a natural hazard risk in the area of the one or more catchment and/or stabilization devices from an analysis of the datasets of the outdoor sensor network, wherein in the analysis of the datasets a pattern recognition is carried out by the external analysis and/or prediction unit using a significant time interval of all of the datasets that are received and the geographic coordinates of the respective sensor modules, wherein in the pattern recognition, progressions of the impact sensor data and/or the rope force sensor data of the datasets of individual sensors of the sensor modules of the outdoor sensor network and/or correlations of the progressions of the impact sensor data and/or the rope force sensor data of the datasets of a plurality of the individual sensors of the sensor modules of the outdoor sensor network are determined, resulting in a deduction of an augmentation or reduction of the natural hazard risk, and wherein on a basis of the pattern recognition a prediction of the natural hazard risk in the form of a probability of an occurrence of impacts into the respective catchment and/or stabilization device is determined by the external analysis and/or prediction unit, and Triggering a maintenance of the respective catchment and/or stabilization device, an immediate repair of the respective catchment and/or stabilization device or a deployment of a maintenance drone and/or a reconnaissance drone to the respective catchment and/or stabilization device depending on the prediction of the natural hazard risk that is determined by the external analysis and/or prediction unit.

2. The sensor-network-based analysis and/or prediction method according to claim 1, wherein the one or more catchment and/or stabilization devices comprise metal components which are exposed to atmospheric corrosion, and that the natural hazard risk provided to a user group comprises a remaining lifetime of the one or more catchment and/or stabilization devices that has been determined on the basis of the datasets of the outdoor sensor network.

3. The sensor-network-based analysis and/or prediction method according to claim 1, wherein the natural hazard risk that is provided comprises a corrosion protection layer removal rate of corrosion-protection-coated metal components, which has been determined on the basis of the datasets of the outdoor sensor network.

4. The sensor-network-based analysis and/or prediction method according to claim 3, wherein a corrosion classification of a geographical environment of the one or more catchment and/or stabilization devices is defined taking the corrosion protection layer removal rate which is determined into account.

5. The sensor-network-based analysis and/or prediction method according to claim 1, wherein in at least one area the sensor modules of the outdoor sensor network are installed prior to a planned building of the one or more catchment and/or stabilization devices, and that then a confectioning of the one or more catchment and/or stabilization devices is carried out depending on the natural hazard risk that is determined.

6. The sensor-network-based analysis and/or prediction method according to claim 5, wherein a catchment and/or stabilization device of the one or more catchment and/or stabilization devices comprises an installation of a wire netting and/or of a wire rope, wherein a selection of a type and/or a thickness of a corrosion protection layer of the wire netting and/or the wire rope is made on the basis of the natural hazard risk that is determined.

7. The sensor-network-based analysis and/or prediction method according to claim 5, wherein a catchment and/or stabilization device of the one or more catchment and/or stabilization devices comprises an installation of a wire netting and/or of a wire rope, wherein a selection of a wire thickness and/or of a material of the wire netting and/or of the wire rope is made on the basis of the natural hazard risk that is determined, and/or wherein a selection of a dimension of the wire netting and/or of a mesh size of meshes of the wire netting is made on the basis of the natural hazard risk that is determined.

8. The sensor-network-based analysis and/or prediction method according to claim 1, wherein the prediction of the natural hazard risk is created on the basis of previously obtained progressions of the datasets of the outdoor sensor network.

9. The sensor-network-based analysis and/or prediction method according to claim 1, wherein a maintenance schedule for a catchment and/or stabilization device of the one or more catchment and/or stabilization devices is created on the basis of the natural hazard risk that is determined.

10. The sensor-network-based analysis and/or prediction method according to claim 9, wherein an organization of maintenance personnel, an organization of maintenance gear and/or an organization of expendable materials is done on the basis of determined natural hazard risks of a plurality of catchment and/or stabilization devices.

11. A remote-monitoring sensor device with a sensor module for an outdoor sensor network, with at least one outdoor corrosion sensor, with at least one ambient sensor for determining tropospheric measurement data, and with at least one communication unit for a wireless transmission of the sensor data to an external analysis and/or prediction unit, wherein the sensor module comprises an at least substantially hermetically closed sensor module housing, wherein the hermetically closed sensor module housing is free of plugs, sockets or cable ducts and free of pressure switches and free of exterior antennae, and/or wherein the sensor module comprises at least one rope force sensor which, via a deducing of rope forces pulling at a rope of the respective catchment and/or stabilization device, is configured for a detection of an impact intensity of an impact body in a rockfall barrier, a debris flow barrier, an avalanche barrier, a rockfall drapery, an attenuator, a slope securing, an avalanche defense and/or for a detection of a filling level of the debris flow barrier.

12. The remote-monitoring sensor device according to claim 11, wherein the sensor module comprises a wireless camera interface for a coupling with an external camera.

13. The remote-monitoring sensor device according to claim 11, further comprising an external activation and/or deactivation element, which is configured to activate and/or deactivate the sensor module depending on a relative positioning of the external activation and/or deactivation element with respect to the sensor module housing of the sensor module.

14. The remote-monitoring sensor device according to claim 11, wherein the communication unit is configured to transmit the sensor data directly to the external analysis and/or prediction unit, the external analysis and/or prediction unit being configured to receive sensor data from a plurality of sensor modules which are distributed over different catchment and/or stabilization devices.

15. The remote-monitoring sensor device according to claim 14, wherein in case of non-accessibility of the external analysis and/or prediction unit, the communication unit is configured to transmit the sensor data to a further sensor module of the outdoor sensor network.

16. The remote-monitoring sensor device according to claim 11, wherein the sensor module comprises at least one acceleration sensor.

17. The remote-monitoring sensor device according to claim 11, wherein the sensor module comprises at least one orientation sensor.

18. The remote-monitoring sensor device according to claim 11, wherein for a measurement of the rope force, the rope force sensor comprises at least one strain gauge strip, which is arranged separately from a rope whose rope forces are monitored by the rope force sensor.

19. The remote-monitoring sensor device according to claim 11, wherein the rope force sensor is implemented at least partly integrally with a connection unit of the sensor module, wherein the connection unit is configured for a direct fixation of the sensor module to a rope of the catchment and/or stabilization device.

20. The remote-monitoring sensor device according to claim 11, wherein the outdoor corrosion sensor is based on a measurement of a corrosion current flow generated by corrosion, wherein the outdoor corrosion sensor comprises at least one charge storage which is charged by the corrosion current flow until reaching a charge limit, whereupon the charge storage discharges, and wherein the sensor module comprises an amperemeter, which is configured for measuring discharge currents of the charge storage for a determination of the outdoor corrosion measurement data.

21. The remote-monitoring sensor device according to claim 11, wherein the outdoor corrosion sensor is based on a measurement of a corrosion current flow generated by corrosion, wherein the sensor module comprises at least one accumulator, which is configured for a power supply of at least one component of the sensor module, and wherein the corrosion current flow of the outdoor corrosion sensor functions as a charging current for an electric charging of the accumulator.

22. The remote-monitoring sensor device according to claim 11, wherein the sensor module comprises a pre-analysis unit, which is configured to execute at least one close-to-sensor pre-analysis of measurement data of at least one of the sensors of the sensor module and/or of at least one external sensor or an external camera that is coupled with the sensor module.

23. The remote-monitoring sensor device according to claim 22, wherein the pre-analysis unit is configured to do an autonomous selection of which portion of a measurement dataset of a sensor is sent out by the communication unit, and/or whether a measurement dataset of a sensor is or is not sent out by the communication unit.

24. The remote-monitoring sensor device according to claim 22, wherein the pre-analysis unit is configured to define a transmission interval of the communication unit using measurement data of at least one sensor of the sensor module and/or of at least one external sensor that is coupled with the sensor module.

25. The remote-monitoring sensor device according to claim 22, wherein the pre-analysis unit is configured to define, on the basis of measurement data of at least one sensor of the sensor module and/or of at least one external sensor that is coupled with the sensor module, a regulation of standby phases and/or measurement intervals at least of the sensor and/or of at least one further sensor.

26. The remote-monitoring sensor device according to claim 11, wherein the sensor module comprises a computing unit with a specifically developed operating system, which is not based on existing operating systems.

27. The remote-monitoring sensor device according to claim 11, wherein the sensor module comprises an energy harvesting unit, which is configured to obtain a current from a temperature difference within the sensor module housing.

28. The remote-monitoring sensor device according to claim 11, further comprising at least one further sensor module, which is allocated to a same catchment and/or stabilization device as the sensor module.

29. The remote-monitoring sensor device according to claim 11, wherein the sensor module comprises a set-up module, which is configured for a wireless communication with an external set-up device of an installer for the purpose of a configuration of the sensor module.

30. The remote-monitoring sensor device according to claim 29, wherein the sensor module comprises a set-up element, being a QR code, a barcode and/or an NFC interface, which can be read out or actuated by the external set-up device for the purpose of initiating the configuration of the sensor module.

31. An outdoor sensor network with a plurality of the remote-monitoring sensor devices according to claim 11, comprising different catchment and/or stabilization devices and respectively comprising sensor modules which are allocated to the different catchment and/or stabilization devices and which in each case communicate wirelessly with a shared external analysis and/or prediction unit.

32. A rockfall barrier, an avalanche defense, a rockfall drapery, a slope securing, a debris flow barrier and/or an attenuator comprising at least one rope, and at least one sensor module of the remote-monitoring sensor device according to claim 11, the sensor module being fixed to the rope.

\* \* \* \* \*